United States Patent
Auer et al.

(10) Patent No.: US 8,600,394 B2
(45) Date of Patent: Dec. 3, 2013

(54) METHOD FOR ASSIGNING FREQUENCY SUBBANDS TO A PLURALITY OF INTERFERING NODES IN A WIRELESS COMMUNICATION NETWORK, CONTROLLER FOR A WIRELESS COMMUNICATION NETWORK AND WIRELESS COMMUNICATION NETWORK

(75) Inventors: Gunther Auer, Munich (DE); Serkan Uygungelen, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 77 days.

(21) Appl. No.: 13/296,560

(22) Filed: Nov. 15, 2011

(65) Prior Publication Data

US 2012/0122467 A1     May 17, 2012

(30) Foreign Application Priority Data

Nov. 15, 2010 (EP) .................... 10191248

(51) Int. Cl.
*H04W 40/00* (2009.01)

(52) U.S. Cl.
USPC ........... 455/447; 455/63.1; 455/453; 370/329

(58) Field of Classification Search
USPC ........................................ 455/63.1, 446–453
See application file for complete search history.

(56) References Cited

U.S. PATENT DOCUMENTS

2009/0161612 A1*  6/2009  Liu et al. ................. 370/329

FOREIGN PATENT DOCUMENTS

| EP | 2207375 A1 | 7/2010 |
| JP | 2008-131151 A | 6/2008 |
| JP | 2010-226247 A | 10/2010 |
| JP | 2012-004836 A | 1/2012 |

OTHER PUBLICATIONS

Bharucha, Zubin et al., "Throughput enhancement through femtocell deployment," European Transactions on Telecommunications, 2010, vol. 21, pp. 469-477.
Brélaz, Daniel, "New Methods to Color the Vertices of a Graph," École Polytechnique Fédérale de Lausanne, Communications of the ACM, vol. 22, No. 4, pp. 251-256.
Cai, Kan et al., "Trade: Cooperation without Trust in 802.11 Networks," Eighth IEEE Workshop on Mobile Computing Systems and Applications, 2007, pp. 58-63.
Chandrasekhar, Vikram et al., "Femtocell Networks: A Survey," Topics in Radio Communications, IEEE Communications Magazine, Sep. 2008, pp. 59-67.
Ellenbeck, Jan et al., "Decentralized Inter-Cell Interference Coordination by Autonomous Spectral Reuse Decisions," 14th European Wireless Conference, Jun. 2008, 7 pages.
Unknown author, "Simulation assumptions and parameters for FDD HeNB RF requirements," Alcatel-Lucent, picoChip Designs, Vodafone, 3GPP TSG RAN WG4 (Radio) Meeting #51, May 2009, 8 pages.

(Continued)

*Primary Examiner* — Vladimir Magloire
(74) *Attorney, Agent, or Firm* — Brinks Gilson & Lione

(57) ABSTRACT

A method assigns frequency subbands to a plurality of interfering nodes in a wireless communication network, wherein the number of subbands assigned to a node depends on the interference condition of the node, wherein as the node faces less interference it is assigned more subbands.

12 Claims, 14 Drawing Sheets

(56) References Cited

OTHER PUBLICATIONS

Unknown author, 3$^{rd}$ Generation Partnership Project; Technical Specification Group Radio Access Network; Evolved Universal Terrestrial Radio Access (E-UTRA); TDD Home eNode B (HeNB) Radio Frequency (RF) requirements analysis (Release 9), Technical Report, 3GPP TR 36.922 V9.1.0, Jun. 2010, 74 pages.

Unknown author, 3$^{rd}$ Generation Partnership Project; Technical Specification Group Radio Access Network; Evolved Universal Terrestrial Radio Access (E-UTRA); Radio Frequency (RF) system scenarios (Release 10), Technical Report, 3GPP TR 36.942 V10.0.0, Jun. 2010, 110 pages.

Office Action from counterpart Japanese Application No. 2011-249625, dated Jan. 29, 2013, 2 pages.

\* cited by examiner

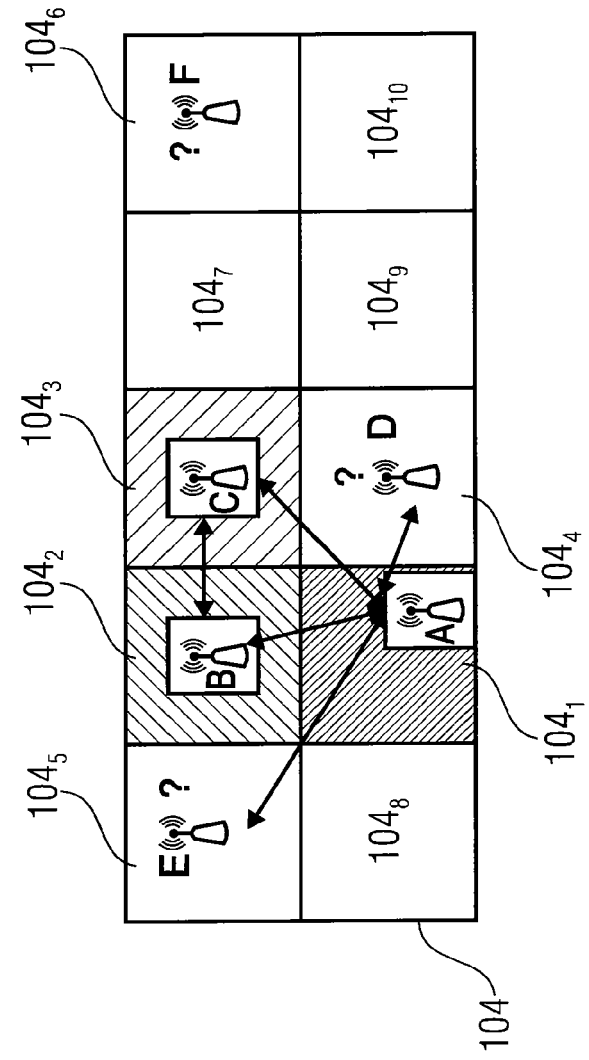
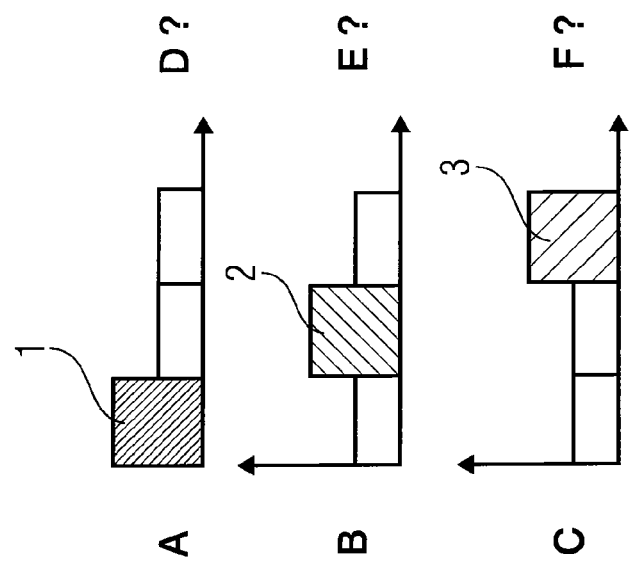
FIG 3A
FIG 3B

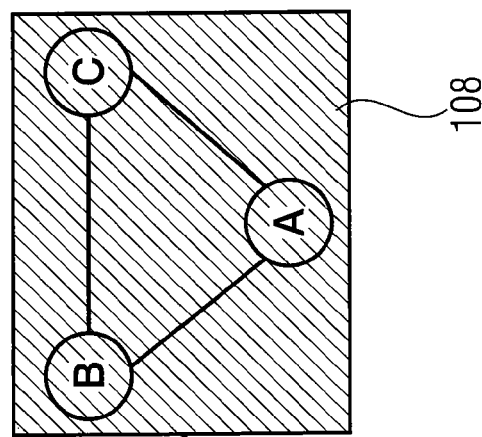
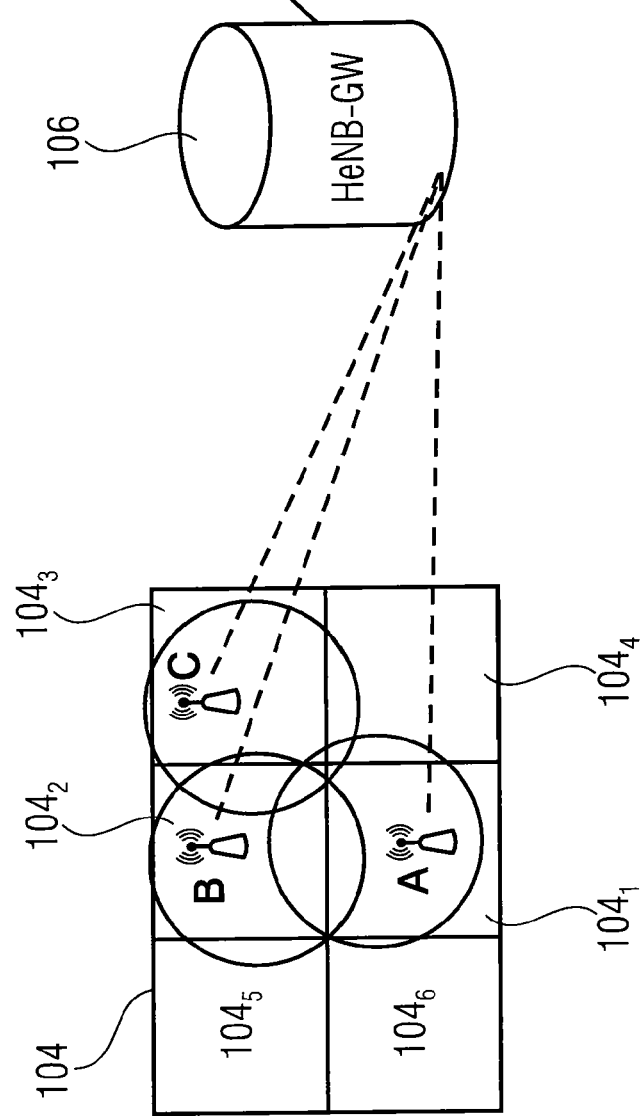
FIG 4B
FIG 4A

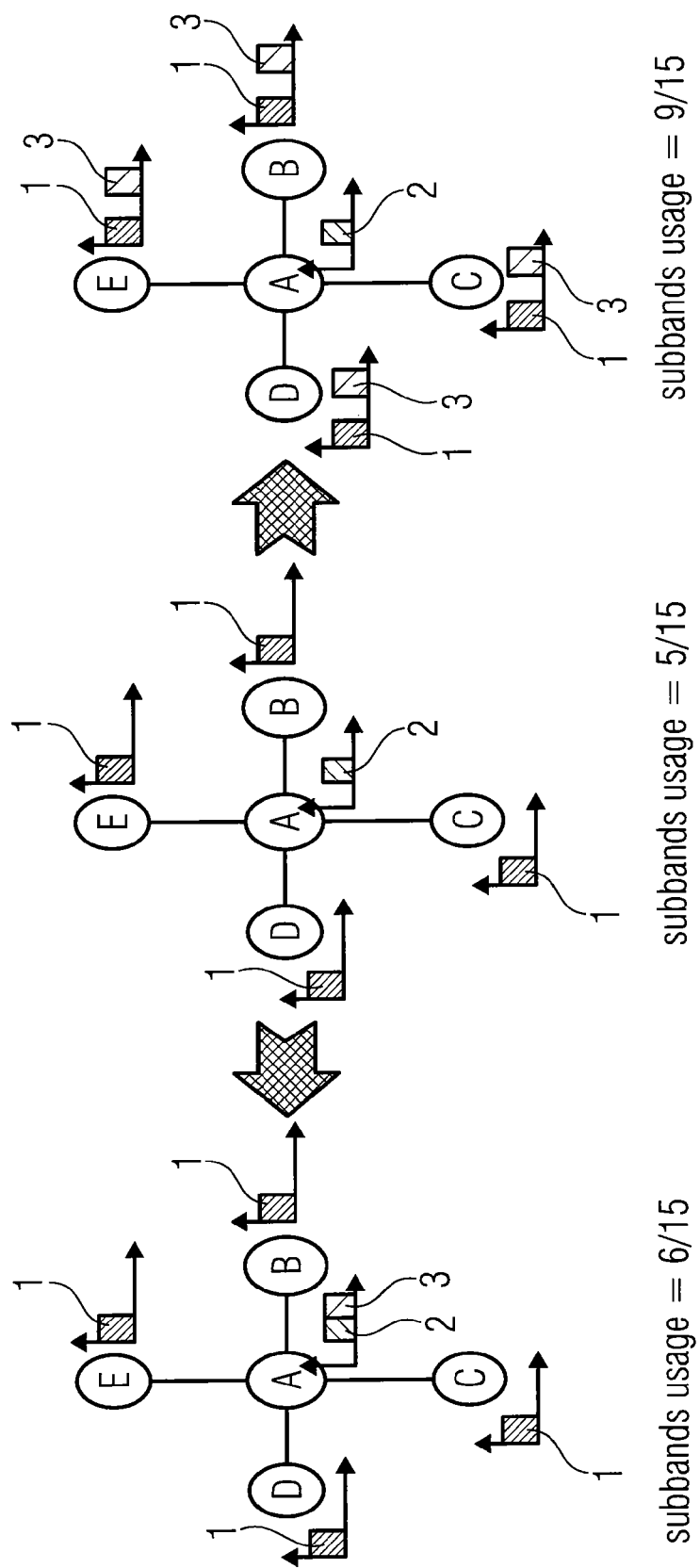

METHOD FOR ASSIGNING FREQUENCY SUBBANDS TO A PLURALITY OF INTERFERING NODES IN A WIRELESS COMMUNICATION NETWORK, CONTROLLER FOR A WIRELESS COMMUNICATION NETWORK AND WIRELESS COMMUNICATION NETWORK

RELATED APPLICATIONS

This application claims priority under 35 U.S.C. §119 to European Patent Application No. 10191248.3 filed on Nov. 15, 2010, the entire content of which is hereby incorporated by reference.

BACKGROUND OF THE INVENTION

1. Field of the Invention

Embodiments of the invention relate to the field of wireless communication networks, more specifically to the field of heterogeneous networks comprising femtocells. More specifically, embodiments concern a method for assigning frequency subbands to a plurality of interfering nodes in a wireless communication network, and to a controller for a wireless communication network, and to a wireless communication system including such a controller.

2. Description of the Related Art

Heterogeneous networks promise high system performance in terms of capacity and coverage. A femtocell is one of the important parts of such networks. In networks where femtocells are deployed densely, interference mitigation between such femtocells becomes crucial in order to provide for a desired quality of service (QoS). In wireless networks, data traffic increases day by day and mobile operators face difficulties in satisfying users' demands. One solution to this problem is the introduction of a femtocell access point (FAP) also known as home evolved nodeB (HeNB). These access points or nodes are small base stations deployed by users and are mostly used for indoor environments. FIG. 1 is a schematic representation of a network cell 100 comprising a base station 102. In FIG. 1 an indoor environment 104 is schematically illustrated which lies within the cell 100. The indoor environment 104, for example, includes a first room $104_1$ and a second room $104_2$. In each room $104_1$ and $104_2$ a user deployed femtocell access point or home evolved nodeB is indicated by the reference signs HeNB-1 and HeNB-2. Within each room $104_1$ and $104_2$ a user equipment FUE-1 and FUE-2 is positioned. Further, within the cell 100 one mobile user equipment MUE is shown. The user equipment FUE-1 positioned in the first room $104_1$ of the indoor environment 104 directly communicates with the base station 102 as is indicated by arrow 1. The mobile user equipment MUE provided outside the environment 104 and inside the cell 100 communicates with the femtocell access point HeNB-1, as is indicated by arrow 2. In the second room $104_2$ of the indoor environment 104 a further user equipment FUE-2 is provided which also communicates with the femtocell access point HeNB-1 in the first room $104_1$ of the indoor environment 104.

The main advantage of the HeNBs is the significant improvement in indoor coverage and capacity that cannot be achieved by using macrocells only, as it is for example described by H. Claussen, "Performance of Macro- and Co-Channel Femtocells in a Hierarchical Cell Structure," in Proc. Of the 18th IEEE International Symposium on Personal, Indoor and Mobile Radio Communications (PIMRC), Athens, Greece, Sep. 3-7 2007, pp. 1-5, and by Z. Bharucha, H. Haas, A. Saul, and G. Auer, "Throughput Enhancement through Femto-Cell Deployment," European Transactions on Telecommunications, vol. 21, no 4, pp. 469-477, Mar. 31 2010. Since the coverage area of an HeNB is small, the available spectrum can be reused more often. Also, as the indoor users are served by HeNBs, the traffic load of the macrocell 100 decreases, which is another advantage of the femtocell deployment by operators, as is also described by V. Chandrasekhar, J. Andrews, and A. Gatherer, "Femtocell Networks: A Survey," IEEE Communications Magazine, vol. 46, no. 9, pp. 59-67, 2008.

However, the deployment of femtocells also comes with some problems. Among such problems interference between femtocells (co-channel interference) needs more attention, especially in networks where femtocells are densely deployed, such as a network of a company, a shopping mall, etc. Unlike macrocells, femtocells are placed by end users, so that frequency planning is not possible. In addition, there can be situations where two femtocells are deployed very close to each other, and in such situations user equipments (UEs) face a high interference from neighboring femtocells, and these UEs probably go into outage. In FIG. 1, such an interference situation is schematically shown between the user equipment FEU-2 in the second room $104_2$ and the HeNB-1 in the first room $104_1$ of the indoor environment. Thus, the deployment of femtocells allows for an increase in coverage, an increase in data rate, however, this comes with an increase in interference. Thus, conventional approaches have the problem that user experience in femtocell networks cannot be maintained at an acceptable level.

One known solution to this problem is applying a resource partitioning approach. In accordance with such an approach, neighbors interfering with each other use different subbands, which are also called priority subbands having a maximum transition power. The rest of the subbands, the so called secondary subbands, are not used or are used with a power control so as not to interfere with the priority band of the neighboring femtocell. FIG. 2 illustrates the approach of interference mitigation by resource partitioning. FIG. 2(A) shows an example of three cells A, B and C adjacent to each other, each cell comprising a base station $eNB_A$, $eNB_B$ and $eNB_C$. The first cell A uses a first resource 1, for example a first frequency band within an available frequency range. The second cell B uses a second resource 2, for example a second frequency band, and cell C uses a third resource 3, for example a third frequency subband. FIG. 2(B) illustrates how interference mitigation by resource partitioning is achieved, namely by selecting the subbands 1 to 3 in such a way that the cells A to C use non-overlapping priority subbands within the available frequency range F. In FIG. 2(B), an example is shown comprising the three neighboring cells A, B and C in which a first frequency band 1 is used by the cell A, whereas the remaining subbands, the secondary subbands ii and iii are either not used at all or with reduced power when compared to the priority subband 1. In a similar manner cell B has as priority subband the subband 2 and the remaining, secondary subbands i and iii are either not used or with a reduced power. The same is true for cell C using the third subband 3, wherein the first and second secondary subbands i and ii are not used or with a reduced power. As can be seen from FIG. 2, maximizing the system capacity and maintaining an acceptable user experience to all users may be contradicting goals. The interference management by resource partitioning allows a cell center user to use all resources with reduced power, while cell-edge users are assigned priority bands, where they may transmit with full power.

Thus, the UEs to which a priority subband is allocated face less interference and enjoy higher capacity values. However, resource partitioning decreases the resource efficiency of the network. The more bandwidth is assigned as a secondary band, the less resources are used with maximum available power. For macrocell networks a variety of resource partitioning approaches are known. In such networks neighbors of a base station are known a priori including the locations and cell IDs. Depending on the number of neighbors and the locations the total frequency band is divided into orthogonal regions and each base station uses one of these regions as its priority subband.

Using such an approach may be difficult in femtocell networks and the above described resource partitioning approach may not be applicable to such networks easily. FIG. 3 shows a schematic representation for illustrating how priority subbands using the resource partitioning approach may be assigned in a femtocell network. FIG. 3(A) illustrates schematically an indoor environment 104 having a plurality of rooms $104_1$ to $104_{10}$ in which in rooms $104_1$ to $104_6$ respective femtocell access points A to F are installed or deployed by a user. For example, in FIG. 3 there may be three FAPs (femtocell access points), A, B and C, at the beginning. In this case, resource partitioning as shown in FIG. 2 can be used. However, after a certain time additional FAPs, e.g. D, E and F, may enter the network. As can be seen, the femtocell access points (HeNBs) are provided in neighboring rooms $104_1$ to $104_5$ while femto access point F is arranged in room $104_6$, distant from the remaining femtocell access points. The arrows in FIG. 3(A) illustrate possible interference paths between the respective femtocells, and as can be seen, it is assumed that cell A may interfere with cells B to E but not with cell F. Cell B in room $104_2$ is assumed to interfere with cells A and C, but not with cells D to F. Cell C in room $104_3$ is assumed to interfere with cells A and B but not with cells D to F. Cells D and E are assumed to interfere only with cell A while cell F, as mentioned above, is further away from the remaining cells so that no interference is assumed. Applying the above described approach of resource partitioning yields a frequency subband distribution as it is shown in FIG. 3(B), which is similar to the one shown in FIG. 2(A) in that the three available subbands within the frequency range are distributed among cells A, B and C, however, this does not cover cells D, E and F as is indicated by the question marks in FIG. 3(B). Thus, FIG. 3 shows the necessity of dynamic resource partitioning. Dynamic resource partitioning may be done in a centralized way or in a distributed way.

In a distributed approach, each base station determines the resources used by itself. Distributed resource partitioning methods in macro and femto networks are described e.g. by:

Y.-Y. Li, M. Macuha, E. Sousa, T. Sato, and M. Nanri, "Cognitive interference management in 3G femtocells," in Personal, Indoor and Mobile Radio Communications, 2009 IEEE 20th International Symposium on, Sep. 13-16 2009, pp. 1118-1122, J. Ling, D. Chizhik, and R. Valenzuela, "On Resource Allocation in Dense Femto-deployments," in Microwaves, Communications, Antennas and Electronics Systems, 2009, COMCAS 2009, IEEE International Conference on, Nov. 9-11 2009, pp. 1-6, J. Ellenbeck, C. Hartmann, and L. Berlemann, "Decentralized Inter-Cell Interference Coordination by Autonomous Spectral Reuse Decisions," in Wireless Conference, 2008, EW 2008, 14 European, Jun. 22-25 2008, pp. 1-7, and C. Lee, J.-H Huang, and L.-C. Wang, "Distributed Channel Selection Principles for Femtocells with Two-Tier Interference," in Vehicular Technology Conference (VTC 2010—Spring), 2010 IEEE 71st, May 16-19 2010, pp. 1-5.

In accordance with such known methods, each (H)eNB uses only a predefined number of subbands for transmission. Changing interference conditions are neither recognized nor handled. Another drawback of such approaches is that the resources to be used are determined by listening to the environment and there is no coordination between the neighboring (H)eNBs. Thus, in accordance with the distributed approach the nodes or frequency access points determine the resource they will use, however, only a predefined number of resources per node or (H)eNB is used which results in a low subband usage and a convergence problem.

In the central approach, on the other hand, there is a central controller which takes interference information from all nodes or (H)eNBs and assigns the priority subbands to each (H)eNB according to these feedbacks. Since the priority bands are assigned centrally, a more efficient resource utilization may be achieved. The central approach provides for a quick convergence, is effective for networks where cells are densely deployed, however, needs a central controller such as HeNB-GW (GW=gate way).

The most common approach used in central resource assignment is the so called graph theory where the interference relation between cells is mapped into a graph (interference graph). FIG. 4 shows an example of an approach for resource assignment using the graph theory. FIG. 4(A) shows a schematic representation of an indoor environment comprising six rooms $104_1$, $104_2$, $104_3$, $104_4$, $104_5$ and $104_6$. In this indoor environment 104 rooms $104_1$ to $104_3$ are provided with (H)eNBs A to C. The circles around the nodes A to C show their range. As can be seen the ranges overlap. Further, in accordance with the central approach, a central controller 106 is provided that gathers from the respective nodes A to C respective interference information. The central controller 106 generates an interference graph that is depicted in FIG. 4(B), wherein interfering neighbors are for example defined according to a predefined parameter threshold (e.g. SINR=Signal to Interference and Noise Ratio). In the interference graph 108 the nodes A to C correspond to a respective cell (indicated by the circles in FIG. 4(A)), and the edges connecting two nodes represent the interference between the respective cells. Since the cells or ranges of the nodes A to C are intersecting and overlapping the interference graph 108 shows that each nodes A to C interferes with its neighboring node.

Once the interference graph, like the interference graph in FIG. 4(B), is generated priority subbands are assigned according to the constraints in the interference graph. This is generally done by applying graph coloring algorithms which have a low complexity. Resource assignment using the graph coloring algorithms for a macrocell networks is described by:

Chang, Z. Tao, J. Zhang, and C.-C. Kuo, "A Graph Approach to Dynamic Fractional Frequency Reuse (FFR) in Multi-Cell OFDMA Networks," in Communications, 2009, ICC '09, IEEE International Conference on, Jun. 14-18, 2009, pp. 1-6, M. C. Necker, "Integrated scheduling and interferences coordination in cellular OFDMA networks," in Broadband Communications, Networks and Systems, 2007, BROADNETS 2007, Fourth International Conference on, Sep. 10-14 2007, pp. 559-566, and "A Graph-Based Scheme for Distributed Interference Coordination in Cellular OFDMA Networks," in Vehicular Technology Conference, 2008, VTC Spring 2008, IEEE, May 11-14 2008, pp. 713-718.

The interference graph is constructed on the basis of UEs. Since interference conditions of UEs change more frequently, such interference graphs should be updated more frequently which causes a high amount of signalling. Also, in Chang, Z. Tao, J. Zhang, and C.-C. Kuo, "A Graph Approach to Dynamic Fractional Frequency Reuse (FFR) in Multi-Cell OFDMA Networks," in Communications, 2009, ICC '09, IEEE International Conference on, Jun. 14-18, 2009, pp. 1-6, subbands usage efficiency of the whole network is not deeply investigated. On the other hand, in "A Graph-Based Scheme for Distributed Interference Coordination in Cellular OFDMA Networks," in Vehicular Technology Conference, 2008, VTC Spring 2008, IEEE, May 11-14 2008, pp. 713-718 UEs, are colored with one or more colors by a central controller and then each base station allocates its serving UEs one or more resource partitions among the assigned color set of UEs in a way to increase resource allocation. Apart from graph coloring, in D. López Pérez, G. de la Roche, A. Valcarce, A. Jüttner, and J. Zhang, "Interference avoidance and dynamic frequency planning for wimax femtocells networks," in Communication Systems, 2008, ICCS 2008, 11$^{th}$ IEEE Singapore International Conference on, Nov. 19-21 2008, pp. 1579-1584, a central entity assigns the resources using an optimization function to minimize the overall network interference. In this method, the amount of resources assigned to (H)eNBs is estimated in accordance with the traffic demands of each (H)eNB instead of the interference conditions. Therefore, under high traffic load situations where all (H)eNBs necessitate large bandwidths, this approach will fail to assign an interference-free subband to a cell edge user.

Thus, the above described conventional approaches for assigning respective subbands to base stations are not applicable to femtocell networks and are disadvantageous as they do not exploit the complete possible frequency space that may be available and that is needed for effectively assigning priority subbands in a dynamic environment like in a femtocell network. Rather, all conventional approaches dealing with the problem of assigning priority subbands simply select one of a number of possible subbands, in general randomly, so that due to the non-used subbands a decrease of throughput is experienced. The approach described by M. C. Necker, "Integrated scheduling and interferences coordination in cellular OFDMA networks," in Broadband Communications, Networks and Systems, 2007, BROADNETS 2007, Fourth International Conference on, Sep. 10-14 2007, pp. 559-566, deals with macrocells and is not applicable to femtocell networks because each base station utilizes its resource among the sectors after the subbands were allocated to the user equipments. However, in a femtocell network the HeNB has only one sector so that this approach would not improve the performance as it does in macrocell networks.

SUMMARY OF THE INVENTION

An embodiment may have a method for assigning frequency subbands to a plurality of interfering nodes in a wireless communication network, wherein a number of subbands assigned to a node depends from the interference condition at the node, wherein as the node faces less interference it is assigned more subbands.

Another embodiment may have a computer program product having a program including instructions stored by a machine-readable carrier, the instructions executing the inventive method, when run on a computer.

According to another embodiment, a controller for a wireless communication network, the wireless communication network including a plurality of nodes, may have: a storage configured to receive and store a list of neighbors from the plurality of nodes, and a processor configured to assign frequency subbands to interfering nodes of the wireless communication network, interfering nodes being determined from the list of neighbors, wherein the processor is configured to assign a number of subbands to a node dependent from the interference condition of a node, wherein as the node faces less interference, it is assigned more subbands.

According to another embodiment, a wireless communication system may have: a plurality of nodes, wherein at least some of the nodes are interfering nodes, and an inventive central controller.

The present invention provides a method for assigning frequency subbands to a plurality of interfering nodes in a wireless communication network, wherein a number of subbands assigned to a node depends on the interference conditions of the node, wherein as the node faces less interference it is assigned more subbands.

The present invention further provides a controller for a wireless communication network which includes a plurality of nodes. The controller comprises a storage configured to receive and store a list of neighbors for the plurality of nodes, and a processor configured to assign frequency subbands to interfering nodes of the wireless communication network, wherein interfering nodes are determined from the list of neighbors, and wherein the processor is configured to assign a number of subbands to a node dependent on the interference condition of the node, wherein as the node faces less interference it is assigned more subbands.

Embodiments of the invention also provide a computer program product comprising a program including instructions stored by a machine-readable carrier, the instructions executing a method in accordance with embodiments of the invention when run on a computer.

Further embodiments provide a wireless communication system comprising a plurality of nodes, wherein at least some of the nodes are interfering nodes, and a central controller in accordance with embodiments of the invention.

The inventive approach, other than the conventional approaches described above, teaches to assign a specific node as many subbands as possible, provided the interference conditions with neighboring nodes allows for the placement of additional subbands. Thus, there is a possibility to assign to at least some of the nodes in the network a plurality of subbands thereby increasing the efficiency and the throughput.

The inventive approach takes into consideration the dynamic nature of the environment of a femtocell network and especially that the number and position and neighbors may change during the operation so that frequency planning beforehand is not possible. Therefore, the inventive approach teaches a dynamic interference mitigation technique for assigning priority bands thereby providing for a high subband usage efficiency. More specifically, since in femtocell networks the number of neighbors changes during the operation of femtocells, priority subbands used by femtocells are determined and updated dynamically dependent on the interference conditions. Apart from this, the interfering environment of each femtocell differs from each other which means that a femtocell having less interfering neighbors can use more subbands as priority subbands. Consequently, in order to increase the resource usage efficiency, hence, overall system capacity, the femtocells use as much priority bands as possible depending on the locations and numbers of neighbors.

The inventive approach deals with situations as shown in FIG. 3 when additional nodes enter the network and provides a dynamic resource partitioning method that decides which subband should be assigned to which HeNB. The inventive approach allows for an appropriate subband assignment among the HeNBs despite the fact that neighbor relations between these FAPs are not known before.

Embodiments of the present invention teach a resource partitioning method in femtocell networks, and as mentioned above, an objective is to increase the throughput of the user equipments suffering high interference. Frequency bands (the subbands) are distributed among the femtocells in a way that neighboring femtocells do not use the same subband, and for this purpose, in accordance with embodiments a novel central resource assignment method is developed using the graph approach and assigning the subbands in terms of efficiency.

In accordance with embodiments, assigning subbands to the interfering nodes comprises, for each of the plurality of interfering nodes, selecting a frequency subband which causes a minimum decrease in subband usage in the network, determining, for each frequency subband, one or more of the interfering node which face less or no interference with one or more of the remaining frequency subbands, and selecting one or more of the interfering nodes which causes a minimum decrease in subband usage in a network, and assigning the respective remaining one or more frequency subbands to the selective interfering nodes. The subband usage may be defined on the basis of the number of nodes interfering with the chosen node to which a specific subband is assigned. E.g. subbands usage is the percentage of assigned priority subbands to all available subbands. For example, if system has 4 subbands and a HeNB is assigned 2 subbands as priority subbands then subbands usage of the HeNB becomes 50%. In accordance with embodiments, subband usage by assigning a specific subband to a chosen node is defined on the basis of the costs of the subband assignment to the network, wherein the costs are determined on the basis of a set of nodes, each node of which has the following properties (a) the node is a neighbor of the chosen node, (b) the specific subband is not assigned to the node, and (c) the specific subband is not assigned to a neighbor of the node, wherein the decrease in subband usage is minimum when the costs are minimum.

In accordance with embodiments, selecting a frequency subband for each of the plurality of interfering nodes may comprise for each interfering node the selection of an interfering node having the largest number of neighboring nodes (e.g. sorting the nodes according to their saturation degree which is the number of different subbands to which a given node may be connected), finding out, for the selected node, available subbands that can be assigned to the selected node as a priority subband, selecting the subband causing the minimum decrease in subband usage, in case one or more available subbands exist, and in case no available subband exist, selecting no subband for the node. The just mentioned steps may be repeated a predefined number of times, the predefined number of times may be defined by the minimum number of priority subbands that is tried to be assigned to each node.

In accordance with further embodiments, the steps of determining and selecting interfering nodes and assigning frequency subbands may comprise for each subband determining all available nodes to which the subband can be assigned as a priority subband, assigning the subband to the node which causes a minimum decrease in subband usage, and in case more than one node provides a minimum decrease in subband usage, assigning the subband to those nodes having a minimum number of subband assigned thereto.

In accordance with embodiments the interfering nodes are femtocell access points formed by base stations deployed by users, wherein interfering nodes are neighboring nodes, wherein a neighbor of a given node is defined as a node which caused interference with a mobile unit serviced by the given node, wherein each node services one or more mobile units.

In accordance with other embodiments, the wireless communication network may comprise a central controller which assigns frequency subbands to the interfering nodes, wherein the central controller holds a neighbor list for each femtocell. In this embodiment, in case of a change in one or more neighbor lists, the change is reported to the central controller, and the controller, in response to a change, dynamically reassigns the frequency subbands to the interfering nodes.

In accordance with further embodiments, in case assigning the frequency subbands result in one or more interfering nodes not having assigned thereto a subband, any non-assigned interfering node has assigned a subband which is used by the minimum number of nodes neighboring the non-assigned interfering node.

In accordance with an embodiment, to achieve dynamic interference mitigation between femtocells, a novel resource partitioning method is described, which is a graph based dynamic frequency reuse method (GB-DFRM). The main objective of this method is to dynamically assign the priority subbands of femtocells that can be used to improve the throughput of the cell edge user equipments. The GB-DFRM uses the flexibility in the number of assigned subbands which depends on the frequency conditions of each cell. As the cell faces less interference, it is assigned more subbands and this leads to an increase in the resource efficiency of the network.

In accordance with an embodiment in the GB-DFRM a central controller collects the IDs of the interfering neighbors from the femtocells and the maps this information into an interference graph. Then, according to the constraints in the interference graph, it assigns priority subbands from the subband set S with a cardinality |S|=S to the respective femtocells. For this purpose, a modified graph coloring algorithm is used in accordance with embodiments of the invention which considers the subband usage efficiency. In order to provide for a fair distribution of priority subbands among femtocells, especially when the subband set S is large, a design parameter $s_{min}$ may be used which stands for the minimum number of priority subbands that the GB-DFRM tries to assign to each femtocell.

The GB-DFRM may be used for interference mitigation for femtocell networks but may also be applied to other wireless networks where base stations are controlled centrally.

The extension of the cell frequency reuse concept to heterogeneous networks has the effect that it allows a dynamic frequency reuse, wherein the number of subbands and the interference scenario are not known a priori. Unlike traditional frequency planning approaches the new method allows for an uncoordinated deployment of the respective base stations while providing a higher bandwidth utilization than the one achievable by known conventional approaches while necessitating only modest computational complexity and costs.

The GB-DFRM has the following advantages:

Each femtocell is assigned a priority subband: GB-DFRM assigns each femtocell priority subband(s) which are not used or used with a power control by interfering neighbors of the respective femtocell.

Dynamic resource assignment: A central controller updates the interference graph based on the reports from the femtocells and reassigns the priority subbands to them as the interference conditions change.

GB-DFRM takes into account the efficiency in resource usage: Priority subbands are assigned to femtocells in a way that they can be reused by other femtocells in the network as much as possible.

Adaptable priority subband bandwidth: If a total subband number of the system, S, is increased by tuning the parameter $s_{min}$ a minimum bandwidth assigned to a femtocell can be kept in a desired range.

Less complexity: The central conductor only needs the IDs of those neighbors interfering with a respective femtocell, and based on this data the controller assigns the priority subbands by using graph coloring and search algorithms which have a low complexity and cost.

BRIEF DESCRIPTION OF THE DRAWINGS

Embodiments of the present invention will be detailed subsequently referring to the appended drawings, in which:

FIG. 2 illustrates the approach of interference mitigation by resource partitioning, wherein FIG. 3 shows a schematic representation for illustrating how priority subbands using the resource partitioning approach may be assigned in a femtocell network, wherein FIG. 3A illustrates schematically an indoor environment having a plurality of femtocell access points, and wherein FIG. 3B shows a frequency subband distribution obtained by applying a resource partitioning approach, FIG. 4 shows an example of an approach for resource assignment using the graph theory, wherein FIG. 4A shows a schematic representation of an indoor environment, and wherein FIG. 4B shows an interference graph generated by a central controller, FIG. 6 shows an example of an interference graph and a priority subband assignment after applying a coloring algorithm, wherein FIG. 6A shows the interference graph, and wherein FIG. 7 illustrates the limitations of the graph coloring approach for assigning frequency subbands to respective nodes, wherein FIG. 7A shows an example of an indoor environment similar to the one shown in FIG. 3A, and wherein FIG. 9 illustrates an example of the inventive method, wherein FIG. 9A illustrates the results of a known, limited graph coloring approach as shown in FIG. 7B, and wherein FIG. 10 illustrates another example of the inventive approach, wherein FIG. 10A shows an example of a network having five nodes, wherein FIG. 10B shows the network of FIG. 10A in which node A has assigned thereto in addition also subband 3, and wherein FIG. 10C shows the network of FIG. 10A in which each of nodes B-D has assigned thereto in addition also subband 3, FIG. 11 is an example for an interference graph of a network having six nodes, wherein FIG. 11A shows the graph before applying a first step algorithm of the inventive method, wherein FIG. 11B shows an obtained subband assignment after a first iteration of the algorithm, and wherein

DETAILED DESCRIPTION OF THE PREFERRED EMBODIMENTS

Figure 1:
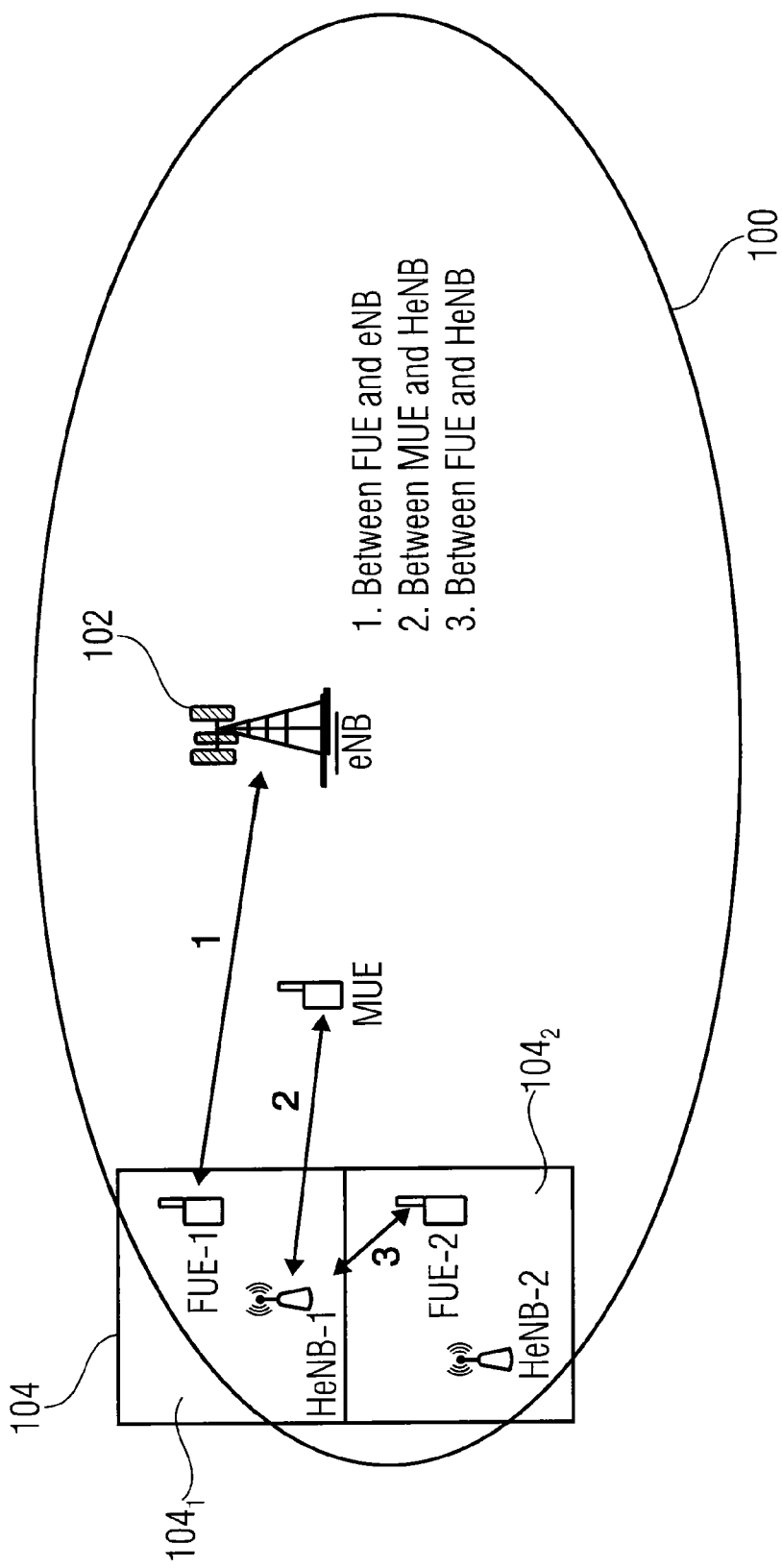
FIG. 1 is a schematic representation of a network cell comprising a base station.
Figure 2B:
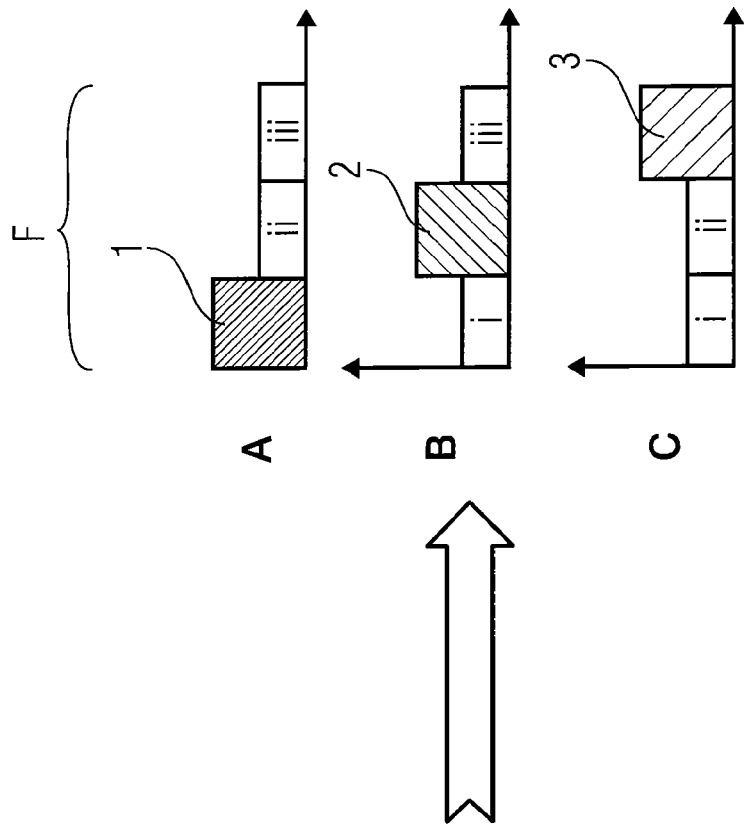
FIG. 2B illustrates how interference mitigation by resource partitioning is achieved.
Figure 2A:
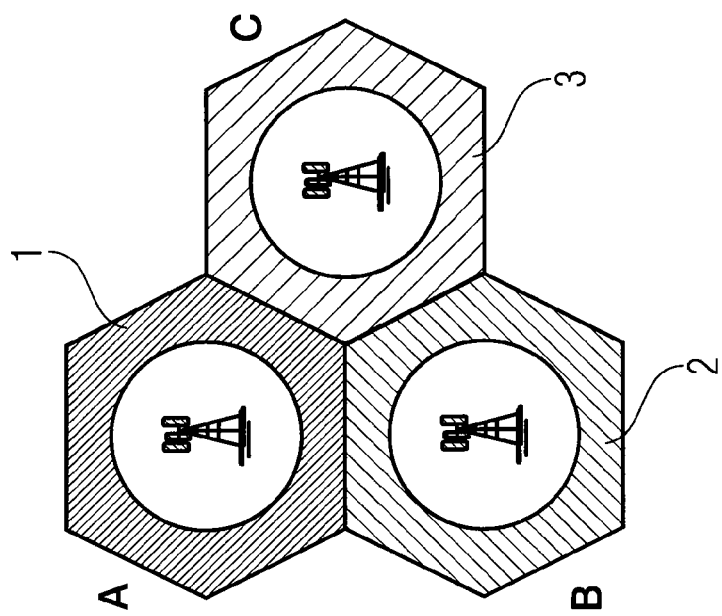
FIG. 2A shows an example of three adjacent cells.
Figure 5:
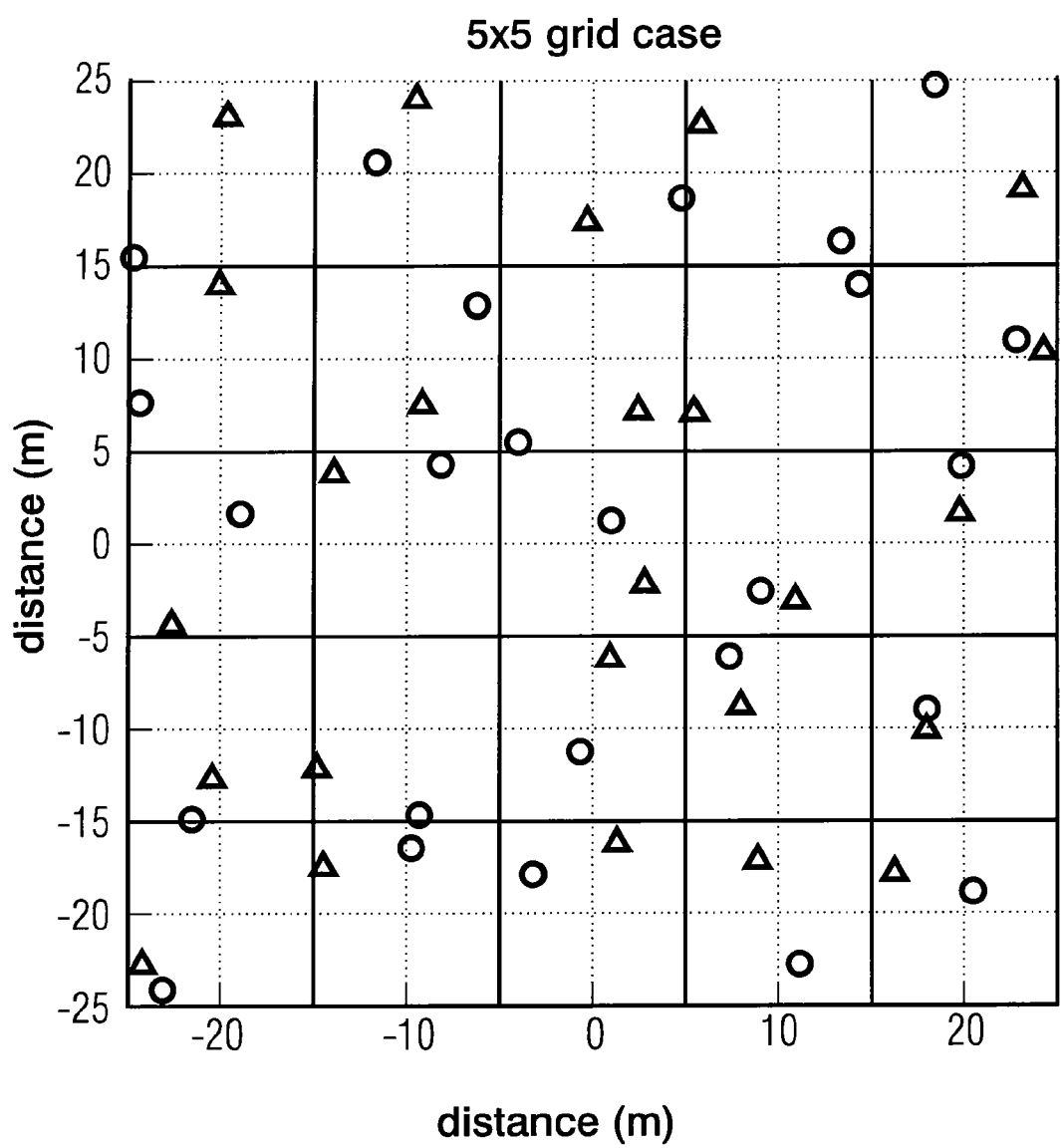
FIG. 5 shows the 5×5 grid model of a femtocell network.

Embodiments of the invention are now described in further detail on the basis of a model as it is described by 3GPP. "Simulation Assumptions and Parameters for FDD HeNB RF Requirements," 3GPP TSG RAN WG4 R4-092042, May 2009 from www.3gpp.org/ftp/Specs/. A femtocell network which is based upon 3 GPP long term evolution (LTE) with a 5×5 grid model is considered in the just mentioned publication. This is a dense HeNB modeling for an urban deployment. In this model, a single floor building with 25 apartments, each having 10 m×10 m size is used. A central controller, which can be the HeNB gateway (HeNB-GW) controls all femtocells of the network. FIG. 5 shows the 5×5 grid model where HeNBs are indicated by $\Delta$ and UEs are indicated by O. There is a maximum of one femtocell at each apartment with a probability of p. If a femtocell is placed in an apartment, it is assumed to be active and to serve only one mobile which is also located in the same apartment. FIG. 5 shows an example deployment with the femtocells and the mobiles. For the sake of simplicity, it is assumed that there is not interference between a macrocell and the femtocell, wherein the femtocell network has a separate spectrum when compared to the macrocell network spectrum.

The system bandwidth is divided into S equal subbands. In accordance with this embodiment each femtocell may use one or more subbands as priority subbands depending on its environment. The transmit power per priority subband is $X_s$. No power control is used for secondary subbands, and the power of these subbands is set to 0. Therefore, in this context, subbands used by a femtocell are equivalent to priority subbands assigned to it. In a downlink transmission, the signal-to-interference-and-noise ratio (SINR) of the received signal at a mobile m (user equipment UE) from a femtocell f using subband s is calculated by:

$$\gamma_s^m = \frac{Y_s^{m,f}}{\sum_{i \in I_{m,s}} Y_s^{m,i} + \eta} \quad (1)$$

where $Y_s^{m,f}$ is the received signal power transmitted from the femtocell f to the mobile m, $I_{m,s}$ is the set of interfering femtocells using the subband s and $\eta$ is the thermal noise. The received power strength is calculated as:

$$Y_s^{m,f} = X_s^f G_s^{m,f} \quad (2)$$

where $X_s^f$ is the transmitted signal power and $G_s^{m,f}$ is the channel gain between the femtocell f and the mobile m, which is the combined effect of path loss and shadowing.

For capacity calculations, an attenuated and truncated form of the Shannon bound method is used. It gives the capacity of a channel with link adaptation which means selecting the modulation and coding schemes based on SINR. Given a specific $\gamma_s^m$, the spectral efficiency of a mobile m on a subband s in [bps/Hz] is calculated in accordance with 3GPP, "Evolved Universal Terrestial Radio Access (E-UTRA); Radio Frequency (RF) System Scenarios," 3GPP TR 36.942 V8.2.0, June 2010 from www.3gpp.org/ftp/Specs/ as follows:

$$\overline{C}_s^m = \begin{cases} \overline{C}_{min} & \text{for } \gamma_s^m < \gamma_{min} \\ \alpha \log_2(1 + \gamma_s^m) & \text{for } \gamma_{min} < \gamma_s^m < \gamma_{max} \\ \overline{C}_{max} & \text{for } \gamma_s^m > \gamma_{max} \end{cases} \quad (3)$$

where $\alpha$ is the attenuation factor which represents the implementation losses, $\gamma_{min}$ and $\gamma_{max}$ are the minimum and maximum SINRs used by the available modulation and coding schemes. Values of these parameters in downlink direction are given in Table 1 (see 3GPP, "Evolved Universal Terrestial Radio Access (E-UTRA); Radio Frequency (RF) System Scenarios," 3GPP TR 36.942 V8.2.0, June 2010 from www.3gpp.org/ftp/Specs/, A. Persson, T. Ottosson, A. Saul, G. Auer, and M. Afgani, "On the Performance of Inter-Sector Scheduling in OFDMA Systems," FREQUENZ Journal of RF-Engineering and Telecommunications, vol. 61, pp. 47-50, January 2007).

TABLE 1

Simulation Parameters

| Parameter | Value |
| --- | --- |
| $\overline{C}_{min}$ [bps/Hz] | 0 (based on QPSK) |
| $\overline{C}_{max}$ [bps/Hz] | 4.4 (based on 64QAM) |
| $\alpha$ | 0.6 |
| $\gamma_{min}$ | −10 dB |
| $\gamma_{max}$ | 19.5 dB |

Given the set of the subbands allocated to user m, $S_m$, the capacity $C_m$ of the user or mobile m is calculated by:

$$C_m = \sum_{s \in S_m} B_s \overline{C}_s^m \quad (4)$$

where $B_s$ is the bandwidth of the subband s.

A neighbor of a given femtocell f is defined as a femtocell which causes interference to the mobile served by the given femtocell f. As already mentioned, because of its user deployed characteristics, it is not possible to know the neighbor of a femtocell beforehand or a priori. Therefore, each femtocell finds out the neighbors during its operation.

In GB-DFRM, a femtocell assigns another femtocell as its neighbor based on a pre-defined design parameter named as SINR threshold $\gamma_{th}$. $\gamma_{th}$ is the minimum desired SINR that each mobile in the network experiences. If a mobile m experiences $\gamma_m$ lower than $\gamma_{th}$, among the all interfering femtocells, $I_m$, the largest interfering femtocell is removed and $\overline{\gamma}_m$ is recalculated again. This process continues until $\overline{\gamma}_m$ increases above $\gamma_{th}$.

$$\overline{\gamma}_m = \frac{Y_{m,f}}{\sum_{i \in \overline{I}_m} Y_{m,i} + \eta} \geq \gamma_{th} \quad (5)$$

In (5), the script for subband is dropped for simplicity. Here, $\overline{I_m}$ is defined as:

$$\overline{I}_m = I_m - I_{m,rem} \quad (6)$$

where $I_{m,rem}$ is the set of removed interfering femtocells. This set of neighbors becomes the neighbor of the serving femtocell in other words neighbor list of f. A similar process is used in M. C. Necker, "Integrated scheduling and interferences coordination in cellular OFDMA networks," in Broadband Communications, Networks and Systems, 2007, BROADNETS 2007, Fourth International Conference on, Sep. 10-14 2007, pp. 559-566, and "A Graph-Based Scheme for Distributed Interference Coordination in Cellular OFDMA Networks," in Vehicular Technology Conference, 2008, VTC Spring 2008, IEEE, May 11-14 2008, pp. 713-718, but neighboring relations are constructed between mobiles. Based on the given neighboring femtocell definition, a subband of a femtocell which is not used by its neighbors (or used with power control) can be named as an interference-free subband.

Figure 6B:
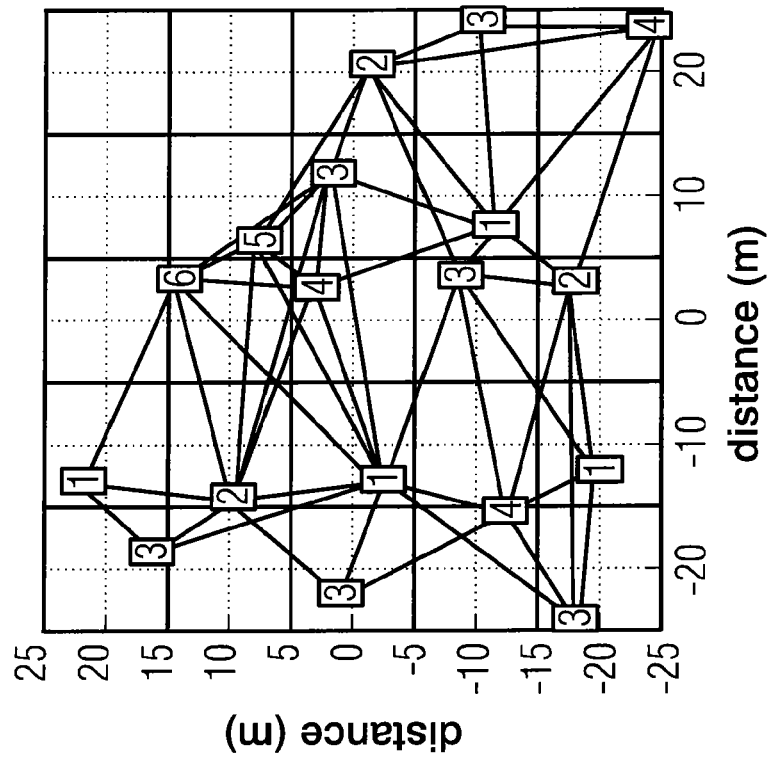
FIG. 6B shows colored nodes.
Figure 6A:
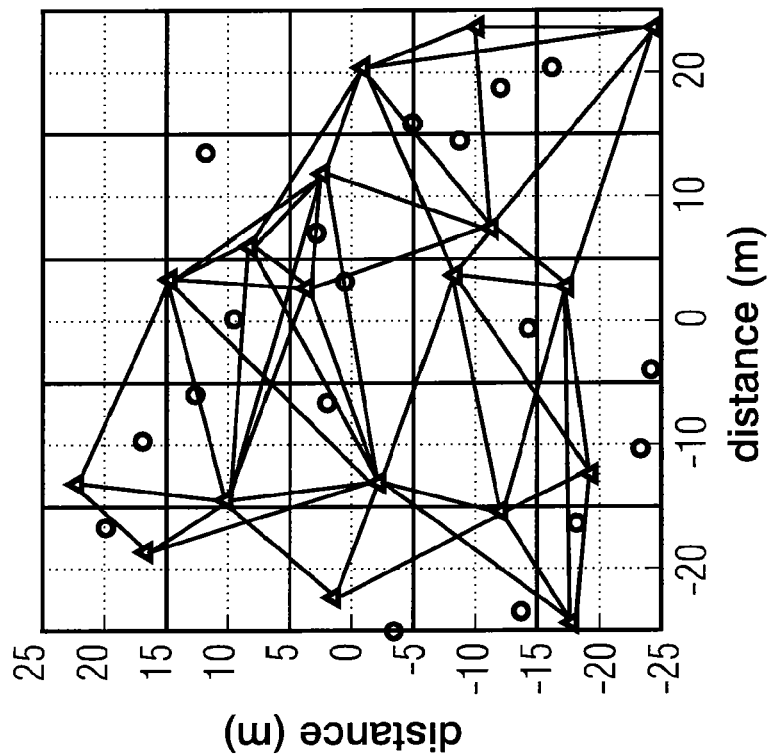

In the following, the construction of an interference graph is described in further detail. All femtocells report their neighbor lists to a central controller when there is a change in their lists such as an entrance of a femtocell in their vicinity. The central controller constructs an interference graph based on neighbor relations between respective femtocells. In the interference graph, each node corresponds to a femtocell, in the following also referred to as node, and the edge connecting two nodes represents the interference between two femtocells. FIG. 6 is an example of an interference graph and a priority subband assignment after applying the coloring algorithm, wherein edges between the nodes indicate that these femtocells should not use the same subband. FIG. 6A describes the interference graph where HeNBs and UEs are indicated by Δ and O, respectively. FIG. 6B shows colored nodes, where each color stands for a different subband (it is noted that in the drawings instead of showing different colors, nodes having assigned the same color are indicated by the same number). FIG. 6 is the example of the interference graph generated using the 5×5 grid model of FIG. 5. Implementing the graph coloring necessitates six colors or subbands so that in FIG. 6B the nodes have assigned one of the numbers between 1 and 6.

FIG. 6A shows an example of an interference graph where $\gamma_{th}$ is selected to be 5 dB. It is noted that the neighboring relation may be symmetrical, i.e. if a femtocell A reports the femtocell B as its neighbor, then the femtocell A will also become the neighbor of the femtocell B whether femtocell B reports it or not. By increasing $\gamma_{th}$ a more complex graph is caused since this increases the number of neighbors, hence, the number of edges in the graph. By this way, higher SINR values are achieved but the trade-off is a decrease in subband usage.

In the following, the graph coloring algorithm is described in further detail. The graph coloring algorithm is used to color the nodes of a graph with a minimum number of colors in a way that no nodes connected by an edge (neighboring nodes) have the same color, as is shown in FIG. 6B (as mentioned above, instead of showing different colors different numbers are associated with the respective nodes). There are various graph coloring algorithms known and among such known algorithms embodiments of the invention use the Dsatur algorithm described in D. Brélaz, "New methods to color the vertices of a graph", Communications of the ACM, vol. 22, no. 4, pp. 251-256, April 1979. This algorithm is used since it works effectively with a low complexity. The algorithm is given below as "algorithm 1" where the saturation degree of a node, $\Theta_{sat}$, is defined as the total number of the different colors to which a node is connected.

| Algorithm 1: The Dsatur algorithm |
| --- |
| 1:     define a color pool, P, which contains only color 1 |
| 2:     repeat |

| Algorithm 1: The Dsatur algorithm |
| --- |
| 3: among the uncolored nodes:<br>select node n having maximum $\Theta_{sat}$<br>if there are nodes having same $\Theta_{sat}$ values then<br>among these nodes select the one having maximum<br>number of uncolored neighbors |
| 4: assign a color to node n:<br>if there is(are) available color(s) in P, color the node<br>n with the one of the available color(s)<br>if not, increase the size of P by 1 and color the node<br>n with newly added color |
| 5: until all nodes are colored |

In a similar way, a priority subband assignment can be done based on the interference graph where two femtocells connected with edges should not use the same subband as a priority subband. In this case, S stands for the color pool and $\Theta_{sat}$ becomes the total number of different subbands assigned to the neighbors of a femtocell. FIG. 6B illustrates how the nodes are colored after applying the Dsatur algorithm. Six subbands or colors are needed to solve all conflicts of a given interference graph. S is a predefined network planning parameter. Therefore, this algorithm works in a desired way as long as S is larger or equal to the necessitated color number P, which equals to the cardinality of P. Otherwise, S will not be enough to assign interference-free subbands to all femtocells. In this case, a femtocell whose color ID is larger than S will be assigned a subband which is also used by its neighbor.

Figure 7B:
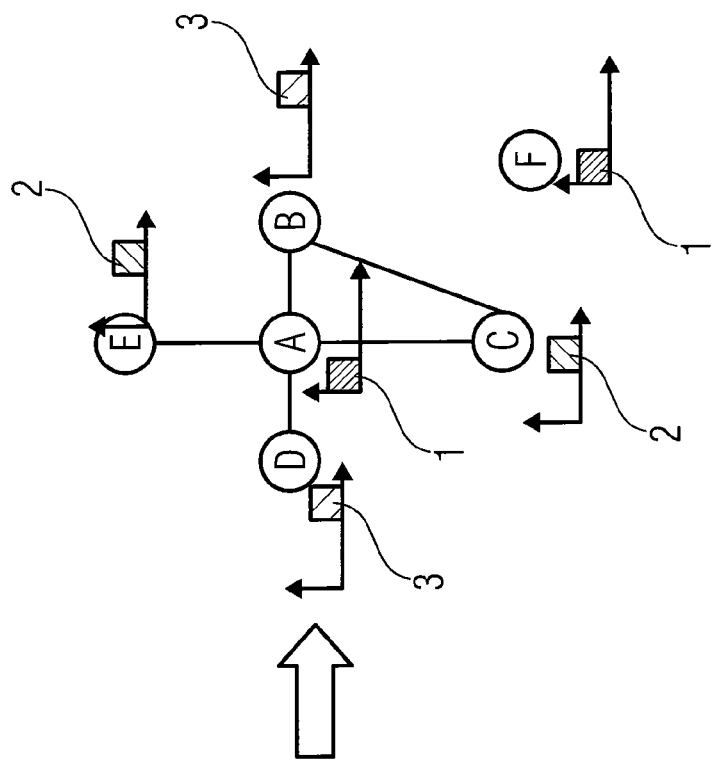
FIG. 7B shows the results of the graph coloring approach.
Figure 7A:
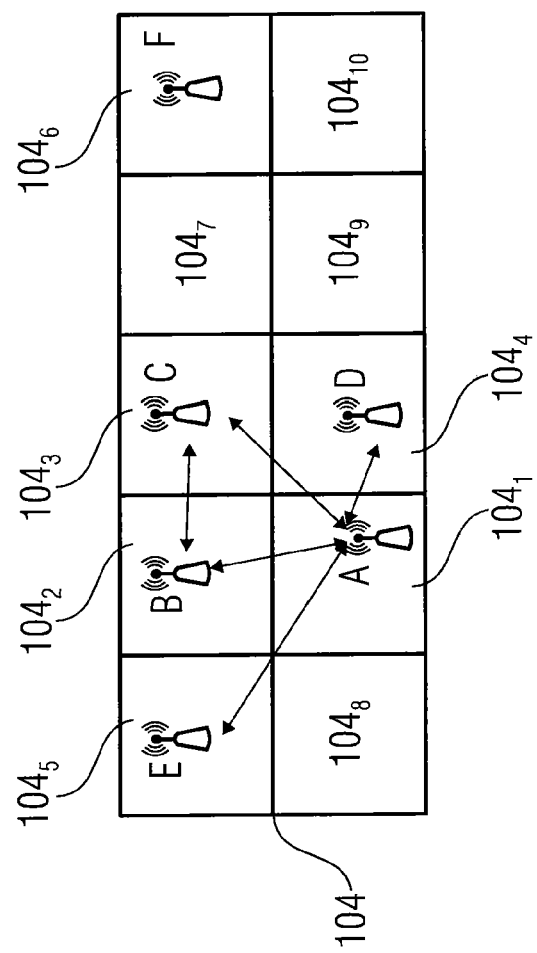

FIG. 7 illustrates the limitations in the above described graph coloring approach for assigning frequency subbands to respective nodes. FIG. 7A shows an example of an indoor environment 104 similar to the one shown in FIG. 3A. It is assumed, like in FIG. 3A, that node A interferes with nodes B-E, that node B interferes with nodes A and C, that node C interferes with nodes A and B, that node D interferes with node A, and that node E interferes with node A. Node F has no interference with the other nodes. The results of the graph coloring approach described above, as it is known in the art, is depicted in FIG. 7B showing an interference graph in which node A is connected to each of nodes B-E via an edge indicating the respective interference between these nodes. The respective edges between the nodes represent the interference between the neighboring nodes and, in addition, it is shown which frequency band, out of three available frequency bands is assigned to the respective nodes A-F. As can be seen, each node has associated therewith only one subband. Node A has assigned the first subband 1, and to avoid interferences with surrounding cells B-E a subband different from the first subband 1 is used. Further, nodes B and C are interfering nodes so that also these two nodes do not use the same subband. Thus, as can be seen, node B has assigned thereto a third subband 3, so that node C has assigned the second subband 2. Nodes D and E are not interfering with each other, but are only interfering with node A, so that each of these nodes can have assigned one of the subbands 2 and 3 which, in accordance with the graph coloring approach described above, is done randomly. In a similar way, since node F is not in any interfering connection with the other nodes, one of three subbands 1-3 is randomly selected, and FIG. 7B shows that subband 1 is selected.

Thus, the drawback of the coloring algorithm is the inefficient usage of the resources. By applying this algorithm, each femtocell is assigned only one priority subband, as is shown in FIG. 7B. Assuming no data is transmitted on secondary subbands, each femtocell then uses only $1/S^{th}$ of the frequency band independent from how many neighbors it has.

(See for example node F or nodes D and E in FIG. 7B). However, a flexibility in the number of assigned subbands is needed to increase the usage of resources. For example, according to FIG. 6B, some of the femtocells have three interfering neighbors, and to these femtocells it is possible to assign $1/4^{th}$ of the frequency band as a priority band. Additionally, increasing S to guarantee that all femtocells use an interference-free subband results in a further decrease of the bandwidth usage for each femtocell. Also, for situations where S>P, some subbands become idle. Since S is determined beforehand, it is not possible to update S, depending on the interference conditions and on P, which are dynamic. Thus, performance of the graph coloring algorithm is highly affected by the value of S. In the method in accordance with embodiments of the invention, these problems are addressed and a modification of the graph coloring algorithm is done to increase the subband usage efficiency and flexibility.

In accordance with embodiments the graph based dynamic frequency reuse approach (GB-DFRM) assigns priority subbands to femtocells in three steps. It defines an optimal solution which leads to a high resource usage efficiency by obeying the constraints of the interference graph. This is achieved by using a cost function which indicates the total decrease in subband usage in a network. Prior to explaining each step of a GB-DFRM in further detail, the cost function and its usage to reach an optimal solution is described in further detail.

As mentioned earlier, a subband s can be assigned to a femtocell f as a priority subband as long as s has not been assigned to neighbors of the femtocell f. When the subband s is assigned to the femtocell f, the costs of this subband assignment to a network is defined as:

$$c(f,s)=|N_{f,s}| \tag{7}$$

where $N_{f,s}$, with cardinality $|N_{f,s}|=N_{f,s}$, is the set of femtocells whose members (femtocells) have the following properties:
  it should be neighbor of femtocell f,
  s has not been assigned to it, and
  s has not been assigned to any of its neighbors.

According to the given property, members of $N_{f,s}$ are the femtocells to which a subband s can be assigned as a priority subband based on the constraints of the interference graph. If the subband s is assigned to femtocell f, it cannot be further assigned to these femtocells, hence this decreases the usage of the subband in the network by $N_{f,s}$. As the cost function stands for the decrease in subband usage, an optimal femtocell f and subband s pair should be the one which minimizes the costs as indicated by equation (7).

In GB-DFRM, the cost function is used in two cases. In the first case, the objective is to find out a subband s among the set of available subbands $S_{av}$ which can be assigned to a femtocell f as a priority subband. The optimal solution is found by selecting the subband which causes minimum decrease in the subband usage in a network as:

$$s = \operatorname*{argmin}_{s \in S_{av}} \{c(f,s)\} \tag{8}$$

In the second case, it is desired to select a femtocell f among the set of available femtocells $F_{av}$ to which the subband s can be assigned as a priority subband. In this case, the optimal femtocell is the one which causes minimum decrease in the subband usage in the network when the subband s is assigned:

$$f = \underset{f \in F_{av}}{\operatorname{argmin}}\{c(f, s)\} \quad (9)$$

Figure 8:
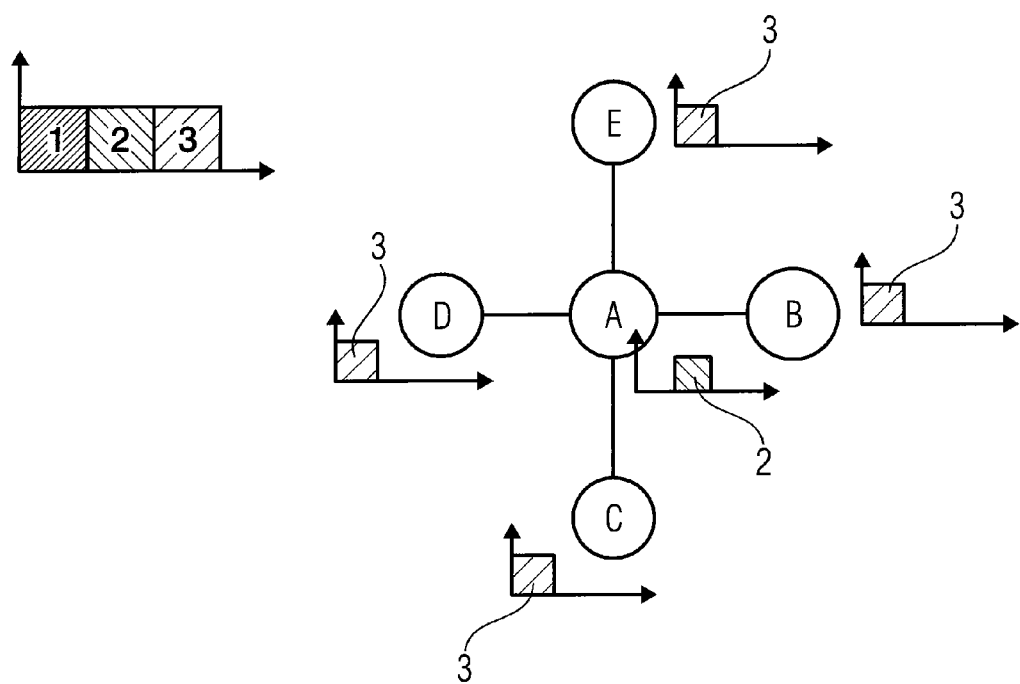
FIG. 8 shows an example of a femtocell network having five nodes.

FIG. 8 illustrates a cost function on the basis of a femtocell network having five nodes. As is shown in FIG. 8, a femtocell network has the five nodes A-E of which each node B-E interferes with node A only. There is no interference between nodes B and C, nodes C and D, nodes D and E and nodes E and B. The cost function, as mentioned above, indicates the decrease in subband usage in the network when a given subband s is assigned to one of the nodes (HeNB) f. In FIG. 8 it is assumed that the frequency band can be divided into three subbands 1, 2 and 3. For node A and subband 3 the cost function c(A, 3)=4 as when assigning the third subband 3 to node A all remaining nodes B-E can no longer be assigned the subband 3 due to the fact that they are neighboring nodes (interfering nodes) with regard to node A so that for these four nodes the subband can no longer be used which is indicated by the costs equal four. On the other hand, for nodes B, C, D and E, each of which only interferes with node A, assigning the third subband 3 to the respective node results in a cost function, c(B, 3)=1 as only one further node in the network, namely, node A, can no longer use this subband. In the example shown in FIG. 8 the costs for assigning subband 3 to node B, C, D or E are the same, and the costs for assigning the third subband to node A is four, i.e. greater than the costs for assigning the subband to the other nodes.

As mentioned above, in accordance with embodiments of the invention, the graph based dynamic frequency reuse method uses two steps. In the first step a looping over the cells and a selecting of a subband for a given cell, which causes minimum decrease in the subband usage in the network, on the basis of the above described cost function, is made. Looping over the cells results in assigning a desired amount of priority subbands to cells, especially when a subband number is high, given a constraint minimum number of subbands per cell $s_{min}$. In the second step, a looping over the subbands is carried out to find out cells facing less interference so that more subbands can be assigned, and selecting a cell which causes a minimum decrease in subband usage in the network. In accordance with an embodiment of the invention, this allows for a dynamic according to the interference conditions which may change, provides for a flexible approach in terms of the number of assigned subbands and results in a high resolution utilization at low complexity and cost.

Figure 9B:
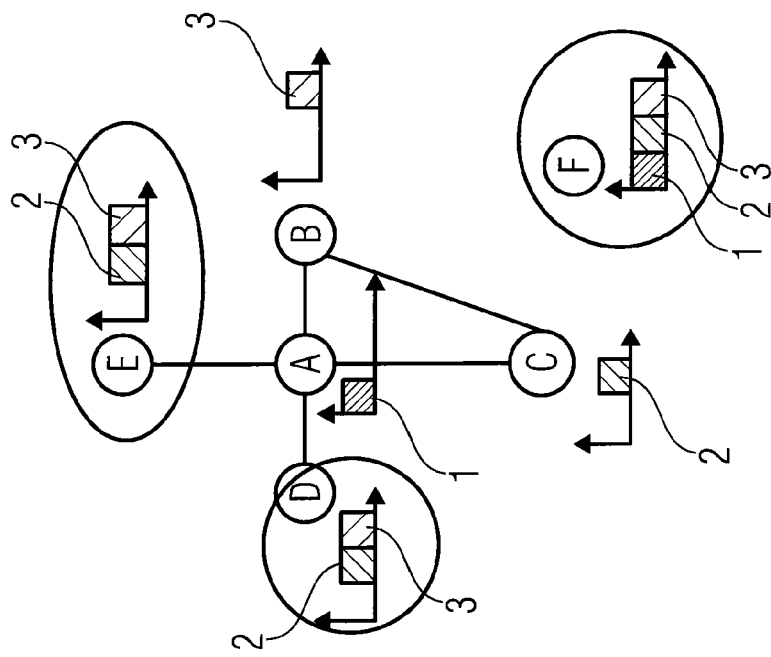
FIG. 9B shows a subband assignment after applying the inventive method.
Figure 9A:
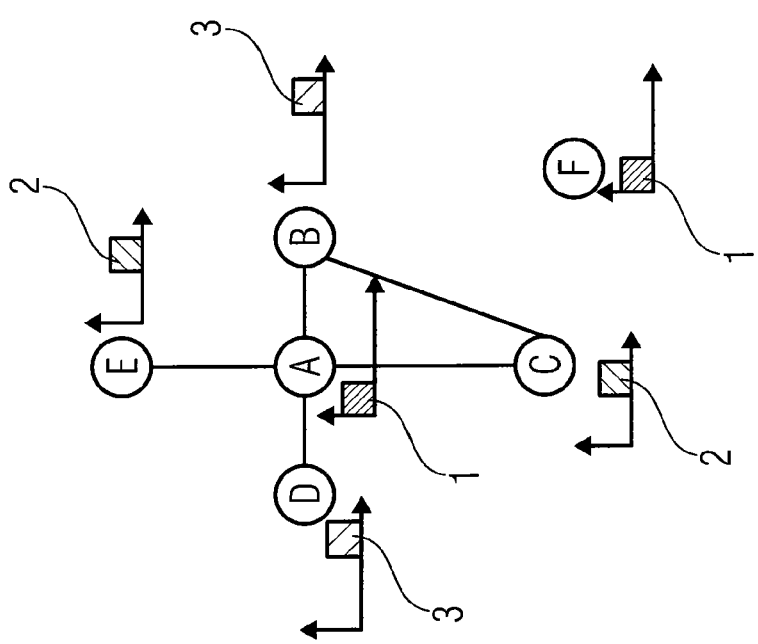

FIG. 9 shows an example of the inventive method looping over the cells and subbands to assign more subbands. FIG. 9A illustrates the results of a limited graph coloring approach as shown in FIG. 7B. Each of the nodes A-F has assigned with it only one single subband. However, applying the inventive method yields a subband assignment as shown in FIG. 9B. In accordance with the inventive method, it is followed that nodes A-C do not allow for the assignment of additional subbands, due to the interference between these three nodes. However, in accordance with the inventive approach, nodes D and nodes E can be assigned with an additional subband, more specifically node D has assigned in addition to original subband 3, also subband 2, which is not used by node A. Since there is no interference between nodes D and C, this assignment is possible. In a similar way, node E has additionally assigned subband 3, which is also not used by node A and since there is no interference between node E and node D and also not between node E and node B, this additional assignment of the third subband 3 is possible. Further, as can be seen, node F has no interference relation with any of the other nodes. It is assigned with all three subbands 1-3.

FIG. 10 shows another example of the inventive approach in accordance with which the appropriate subband and cell pairs are found out to increase subband usage, wherein the subbands are assigned to cells by using the above described cost function, which indicates the decrease in subband usage in the network when a given subband s is assigned to a cell.

FIG. 10A shows an example of a network having five nodes or femtocells A-E, similar to the network used for describing the cost function with regard to FIG. 8. Again, three subbands 1-3 of the frequency band are available and need to be distributed among the respective nodes. In FIG. 10A the results of the conventional coloring algorithm is shown in accordance with which each node has assigned a single subband. As can be seen from FIG. 10A node A has assigned subband 2 and of all other nodes have assigned thereto subband 1. Again, only node A interferes with each other node, while nodes B, C, D and E do not interfere with each other. In FIG. 10A each of the five nodes uses one subband so that five of the available subbands are used, i.e., the subbands usage equals 5/15. In accordance with the inventive approach, subbands and cell pairs are found out to increase the subbands usage. FIG. 10B shows that node A has assigned thereto in addition also subband 3. However, due to the interference relationship of node A with all other nodes B-E, this prohibits use of the third subband 3 at nodes B-E, so that of the 15 subbands in the scenario of FIG. 10B only six subbands are used, so that the subbands usage equals 6/15. Rather than assigning an additional subband to node A, another approach is to assign to the nodes B-E respective additional subbands, in a manner as shown in FIG. 10C. As is shown, each of the nodes B-D has assigned further subband 3, which is also not used by node A which, on the other hand, avoids assigning an additional subband to node A. However, as can be seen, the scenario of FIG. 10C uses nine out of fifteen subbands, i.e. as the subbands usage equals 9/15 which is the highest possible subband usage in the scenario shown in FIG. 10.

Starting from FIG. 10A, the determination as to whether an additional subband is to be assigned to node A or to one of nodes B to E is performed on the basis of the cost function. When looking at FIG. 10B, the cost function for assigning the additional subband to node A yields a value of four because assigning subband 3 to node A prohibits use of the subband 3 in all remaining nodes B-E, so that by way of the assignment in accordance with FIG. 10, a high decrease in subbands usage in the network is obtained. Contrary thereto, when looking at FIG. 10C, the costs associated with assigning the third subband 3 to each of the nodes B-E yields for each node a cost function equals one as only node A can no longer be assigned with the additional subband 3. Therefore, in accordance with the inventive approach applying the cost function the method will automatically select the configuration in accordance with FIG. 10C as the decrease in subbands usage in the network is minimum due to the minimum cost function which, in turn, yields the highest subbands usage, which is 9/15 in FIG. 10C.

The above-mentioned steps will now be described in further detail below.

Step 1: In this step, subbands are assigned to femtocells in a similar manner as in the graph coloring algorithm given above. However, to improve the performance, the algorithm is modified. The first modification is done in the selection process of subbands. In conventional coloring algorithms if there is more than one available subband that can be assigned to a given femtocell, a random selection is done among these subbands. However, in accordance with embodiments of the invention, the most optimum subband causing a minimum decrease in subbands usage in the network is selected on the basis of equation 8. Thus, more subbands can be used in the network. Secondly, unlike in the known graph coloring algorithm cells are looped $s_{min}$ times. At each loop only one subband is assigned to each femtocell. If the algorithm cannot find any available subband for a given femtocell, it skips the femtocell without assigning any subbands. By this way, each femtocell is assigned $s_{min}$ subbands as long as S and $\gamma_{th}$ are selected reasonably. The idea of introducing $s_{min}$ is adapting the minimum priority bandwidth assigned to a femtocell, especially when S is set to be large. The pseudo code of the algorithm used in this step is given below:

| Algorithm 2: Step1 of the GB-DFRM algorithm |
| --- |
| 1: define a pool of subbands, S as [1, 2, ..., S] |
| 2:    for i=1:$s_{min}$ do |
| 3:       mark all femtocells as unselected |
| 4:       repeat |
| 5:          sort the unselected femtocells by decreasing order of $\Theta_{sat}$: Choose a femtocell f having maximum $\Theta_{sat}$ if there are femtocells having same $\Theta_{sat}$ values then among these femtocells choose the one having maximum number of unselected neighbors Mark the chosen femtocell as selected |
| 6:          for chosen f, find out the available subband(s) $S_{av} \subseteq S$ that can be assigned to f as a priority subband: if $|S_{av}| \geq 1$, among $S_{av}$, assign subband s which satisfies (8) if $|S_{av}| = 0$, leave the femtocell without assigning any subband |
| 7:       until all femtocells are marked as selected |
| 8:    end for |

Figure 11C:
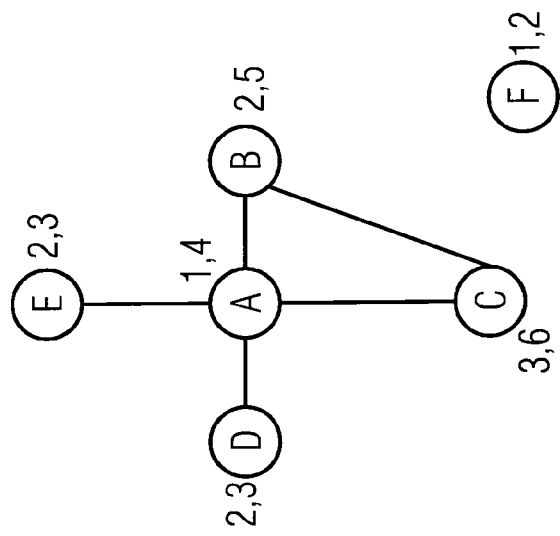
FIG. 11C shows an obtained subband assignment after a second first iteration of the algorithm.

In algorithm 2 the saturation degree of a node ($\Theta_{sat}$) stands for the total number of different subbands to which a node is connected. For example, when considering a network represented by its interference graph as shown in FIG. 11A it is assumed that node A has four neighbors: B, C, D and E. Also, it is assumed that node B is assigned subband 1, node C is assigned subbands 1 and 3, node D is assigned subband 3 and node E is assigned subband 4. Therefore, the neighbors of node A are assigned three different subbands which are 1, 3 and 4. This means saturation degree of node A is 3.

The pseudo code between lines 4-7 of the above algorithm is similar to the graph coloring algorithm, however includes improvements. The code between lines 4-7 selects each node once and assigns a subband to it by using the for statement.

Therefore, at the beginning of each $i^{th}$ loop of the for statement, which corresponds to line 3, all nodes are marked as unselected. Then, the algorithm repeats the code between lines 4-7 until all nodes are selected once. According to the conventional graph coloring algorithm, it is stated that if the saturation degree of nodes are the same then among these nodes select the one having maximum number of uncolored neighbors. It is similar here, however since the nodes are colored more than once and since there can be some nodes which are selected but assigned no subband, the nodes are marked as selected or unselected at the $i^{th}$ loop instead of saying colored or uncolored. This will be explained using FIG. 11.

It is assumed that the system has 6 subbands S={1, 2, 3, 4, 5, 6} and $s_{min}$=2 which means it is desired that each node has at least two priority subbands. The system or network is represented by its interference graph shown in FIG. 11A.

According to the algorithm, we start from i=1 and mark all nodes from A to F as unselected (line 3 in the given algorithm).

Now we need to sort these nodes (line 5). It is clear that saturation degree of all nodes is 0. Therefore, we will choose the one having maximum number of neighbors which are not chosen yet in this $1^{st}$ loop of for statement. In other words, choose the one having maximum number of unselected neighbors.

| Unselected Node | Saturation degree | Number of unselected neighbors |
| --- | --- | --- |
| A | 0 | 4 (B, C, D, E) |
| B | 0 | 2 (A, C) |
| C | 0 | 2 (A, B) |
| D | 0 | 1 (A) |
| E | 0 | 1 (A) |
| F | 0 | 0 |

According to the values given in above table, the algorithm chooses the node A since it has the maximum number of unselected neighbors (B, C, D and E) and marks it as selected. Then the algorithm assigns subband 1 to the node A (line 6).

After assigning a subband to node A, we have 5 nodes which are not chosen in the $1^{st}$ loop of the for statement. In other words, we have 5 unselected nodes which are B, C, D, E and F. This way, we guarantee that all nodes will be chosen only once. If we recalculate the attributes of these nodes, we obtain:

| Unselected Node | Saturation degree | Number of unselected neighbors |
| --- | --- | --- |
| B | 1 | 1(C) |
| C | 1 | 1(B) |
| D | 1 | 0 |
| E | 1 | 0 |
| F | 0 | 0 |

Since node A is assigned a subband, its neighbors B, C, D and E have a saturation degree of 1. Also, as A is selected, B now has only one neighbor which is unselected that is node C. Similarly, node C has only one neighbor which is unselected, that is node B. According to the values given above, algorithm selects node B (line 5) and mark as selected. Then, subband 2 is assigned to B (line 6).

Again, the algorithm comes to line 5 of the code. Since A and B are selected, algorithm chooses a node among C, D, E and F. If we recalculate the attributes of these nodes, we obtain:

| Unselected Node | Saturation degree | Number of unselected neighbors |
| --- | --- | --- |
| C | 2 | 0 |
| D | 1 | 0 |
| E | 1 | 0 |
| F | 0 | 0 |

Since neighbors of node C, which are A and B, have been assigned two subbands (1 and 2), saturation degree of C becomes 2. As node C has the maximum saturation degree, algorithm chooses node C, mark as unselected and assigns a subband.

Figure 11B:
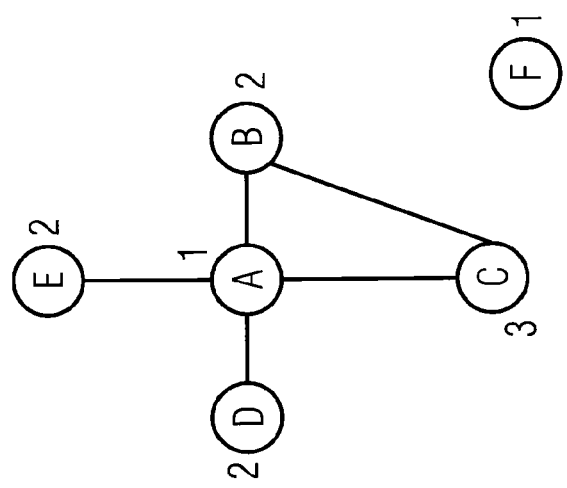
Figure 11A:
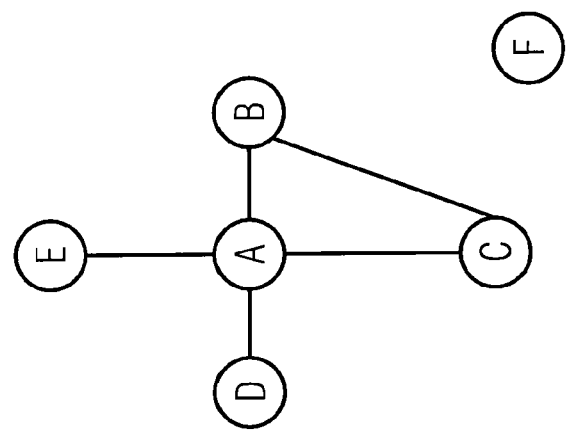

Then, again at line 5, selection is done among D, E and F and this process continues until all nodes are chosen once and we get a subband assignment like the one shown in FIG. 11B (showing the subband assignment at the end of 1st loop of the for statement).

Now, the algorithm starts the second loop of the for statement (line 2). As mentioned above, in this loop all nodes again should be chosen, so we mark all nodes as unselected (line 3).

Now, the code is at line 5. The unselected nodes have following attributes:

| Unselected Node | Saturation degree | Number of unselected neighbors |
|---|---|---|
| A | 2 | 4 (B, C, D, E) |
| B | 2 | 2 (A, C) |
| C | 2 | 2 (A, B) |
| D | 1 | 1 (A) |
| E | 1 | 1 (A) |
| F | 0 | 0 |

Since the neighbors of A use subbands 2 and 3 (B and C are assigned subbands 2 and 3 respectively), the saturation degree of A is calculated as 2. Similarly, the neighbors of B are assigned subbands 1 and 3, therefore node B's saturation degree is also calculated as 2 and so on. Since, A, B and C have maximum saturation degrees, we check their number of unselected neighbors. According to this, the algorithm chooses A and marks it as selected and the algorithm assigns subband 4 to node A (line 6).

Now algorithm is at line 5. In this case, it sorts the nodes B, C, D, E and F which are not chosen.

| Unselected Node | Saturation degree | Number of unselected neighbors |
|---|---|---|
| B | 3 | 1(C) |
| C | 3 | 1(B) |
| D | 2 | 0 |
| E | 2 | 0 |
| F | 0 | 0 |

Since the neighbors of B are assigned subbands 1, 3 and 4, its saturation degree becomes 3 and the saturation degrees of other nodes are calculated similarly. Then, the code chooses B, marks it as selected (line 5) and assigns subband 5 (line 6).

This continues until all nodes are chosen once. At the end of the second loop of for statement, we obtain a subband assignment as is shown in FIG. 11C (showing the subband assignment at the end of $2^{nd}$ loop of the for statement).

FIG. 11C shows the priority subband assignment after applying Step 1 of the inventive method. In step 2 which is described subsequently, an algorithm loops each subband and tries to assign more subbands if it is possible.

Second step: After assigning $s_{min}$ subbands to the femtocells, in the second step the inventive method search, the algorithm used in this step loops over all subbands. For each subband, it searches for the available femtocells to which a selected subband can be assigned as a priority subband. Then, among these available femtocells the one which causes minimum decrease in subband usage is selected on the basis of equation (9). By this way, the same subband can be assigned more femtocells. The pseudo code of this algorithm is given below:

---

Algorithm 3. Step 2 of GB-DFRM algorithm

1:     for s= 1:S do
2:         repeat
3:             find out available femtocells $F_{av}$ to which subband s can be assigned as a priority subband
4:             among $F_{av}$
                assign subband s to femtocell f which provides (9)
                if more than one femtocell provides (9), then assign subband s to the one having minimum number of already assigned subbands
5:         until $|F_{av}|=0$
6:     end for

---

The algorithm used in this step finds the optimum femtocell for a given subband, there is no limitation with regard to the femtocell selection. It is possible for a femtocell not to be assigned any subband during this step if it has a large number of neighbors in the interference graph. On the other hand, subbands are mostly assigned to the femtocells facing less interference since it causes less decrease in subbands usage. Therefore, subband usage in the network will increase if $s_{min}$ is decreased. However, this also decreases the fairness of priority band assignment among femtocells. In this case, a large amount of the frequency band is assigned as a priority band to the femtocells having less neighbors whereas the rest of the femtocells have assigned therewith only a small percentage of the frequency band. As a consequence, $s_{min}$ should be set dependent from S and the network conditions.

For example, in case of FIG. 11C the second step may assign further subbands to the respective nodes using the above algorithm. E.g. the algorithm may assign additional subbands 5 and 6 to each of nodes D and E as there is no interference between nodes D and E and no interference with other nodes (B and C) having assigned subbands 5 and 6. Also node F having no interference with any of the other nodes may have assigned in addition to subbands 1 and 2 also subbands 3, 4, 5, and 6.

Third step: In an optional, third step, in a given network, there may be femtocells which have a large number of interfering neighbors and the above-described algorithms may not be in a position to assign interference-free priority subbands to such a femtocell, if all subbands are already assigned to its neighbors. Therefore, in this step, in accordance with an embodiment of the invention, the method searches for the femtocells that have no subband assigned during the first and second steps. To these femtocells, the algorithm assigns the subband which is used by the minimum number of its neighbors, so that the number of the interfering neighbors using the same subband is minimized. If S is set reasonably, all femtocells can be assigned at least one interference-free priority subband. If power control is used for secondary subbands, then this step can be skipped.

In the following, the results of simulations made by the inventors are given showing the advantages of the inventive approach for dynamically assigning subbands in a way as described above. The parameters that were used in the simulations are taken from 3GPP, "Simulation Assumptions and Parameters for FDD HeNB RF Requirements", 3GPP TSG RAN WG4 R4-092042, May 2009, "Evolved Universal Terrestrial Radio Access (E-UTRA); Radio Frequency (RF) System Scenarios", 3GPP TR 36.942 V8.2.0, June 2010 from www3.gpp.org/ftp/Specs. and 3GPP, "Channel Models for Femtocell", 3GPP TSG RAN1 WG1 #59bis R1-100560, January 2010 from www.3gpp.org/ftp/Specs and are shown in Table 2.

TABLE 2

Simulation Parameters

| Parameter | Value |
| --- | --- |
| System bandwidth | 10 MHz |
| Traffic model | Full buffer |
| min. separation between UE and HeNB | 20 cm |
| HeNB antenna gain | 0 dBi |
| Antenna Pattern (Horizontal) | $A(\theta) = 0$ dB (omnidirectional) |
| Interior path loss | $L = 127 + 30\log_{10}d$ where d is the distance between UE and HeNB in km |
| Fading model | No fast fading |
| Log-normal shadowing standard deviation | 10 dB |
| Shadowing auto-correlation | 3 m |
| max HeNB Tx power | 20 dBm |
| Thermal Noise Density | $N_0 = -174$ dBm/Hz |

In the simulations, all HeNBs and UEs are randomly dropped into the building. The simulation lasted for 1000 drops and at each drop desired data is calculated and collected. $\gamma_{th}$ is set to be 5 dB when the interference graph is constructed. As previously explained, the femtocells use only priority subbands for transmission and do not use secondary subbands. Three different approaches were investigated:

(1) all femtocells use all available subbands (reuse-1)
(2) femtocells are assigned one priority subchannel based on a conventional graph coloring algorithm.
(3) the priority subbands are assigned to femtocells using the inventive GB-DFRM.

Figure 12A:
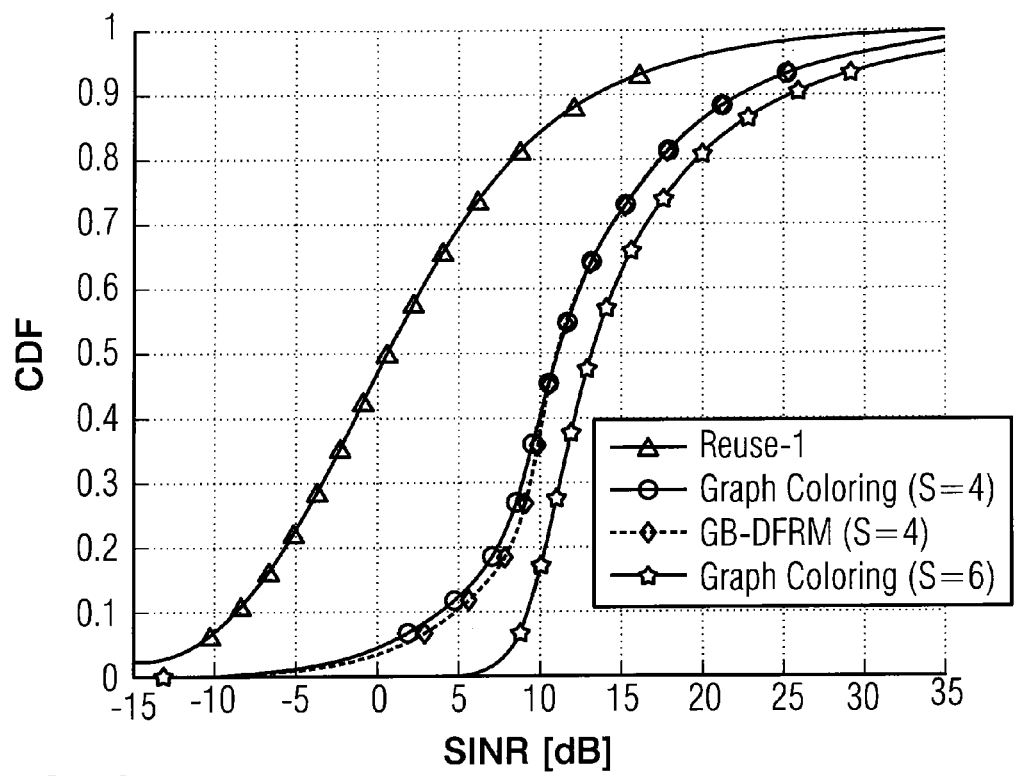
FIGS. 12A and 12B are graphs showing the cumulative distribution function (CDF) of the SINR and the capacity.

FIG. 12 shows the cumulative distribution function (CDF) of the SINR and the capacity for the three approaches. A worst case scenario is assumed where all apartments (see FIG. 5) have one active femtocell. For the resource partitioning methods different subband numbers are used, namely S=4 and S=6, and for GB-DFRM $s_{min}$ is set to 1. According to FIG. 12A, when femtocells use all frequency bands, only 30% of the UEs experience a SINR higher than the predefined SINR threshold, $\gamma_{th}$=5 dB. This SINR distribution indicates the necessity of the interference mitigation techniques. Without applying any interference mitigation techniques, the desired quality of service cannot be achieved for cell edge mobiles. The effect of resource partitioning is significant. For S=4, nearly 90% of the UEs have an SINR higher than 5 dB. By increasing S the SINR values are improved, for S=6 nearly all UEs experience a SINR higher than 5 dB. This is because in the given network four subbands are not enough to solve all conflicts in the interference graph so that some femtocells are assigned a priority subband which is also used by its neighbor(s). However, when S=6 each femtocell is assigned at least one interference-free priority subband in accordance with the inventive approach.

Figure 12B:
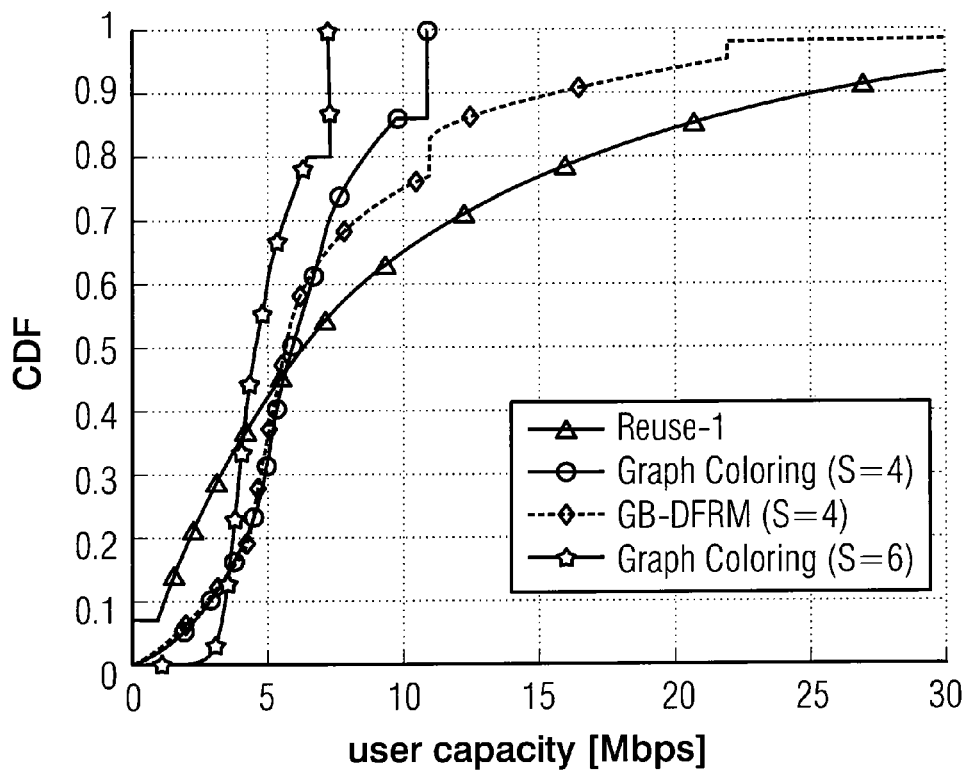

In FIG. 12B the capacities of the three approaches are given. Since each femtocell serves one user, the capacity of a user also stands for the capacity of the femtocell. The steps in the curves are due to the Shannon-bound method used for capacity calculations. According to FIG. 12B, by applying the inventive resource partitioning method, a better performance is obtained at low capacities. Since the UEs at the cell edges face a high interference, allocating less, but interference-free subbands result in a higher capacity. On the other hand, for the UEs facing less interference the increase in the SINRs cannot compensate the decrease in the resources so that the capacities decrease. Thus, for S=6 after about 5 Mbps (for S=4 about 3.7 Mbps), the reuse-1 method overperforms the resource partitioning method. The positive impact of the inventive GB-DFRM at this point can clearly be seen. The more subbands are assigned to the femtocells which face low interference, the better the GB-DFRM performs at high capacities when compared to a graph coloring algorithm. Additionally, increasing S without changing $s_{min}$ improves the performance in low and high capacity regions, but causes a decrease in middle parts. This is reasonable, since by increasing S the possibility of assigning interference-free subbands to a femtocell facing a high interference increases. This causes a shift to the right at the lower part of the capacity curve, however, by changing S from 4 to 6, some of the femtocells are assigned $1/6^{th}$ of the frequency band, instead of $1/4^{th}$ which will decrease their capacities. This effect is seen in the middle part of the curve. The rest of the femtocells facing this interference are assigned more subbands since the inventive approach tries to increase the subbands usage efficiency by assigning more subbands to these femtocells during the second step after allocating $s_{min}$=1 subband to each of the femtocells in the first step. Therefore, the capacities of these mobiles will improve further. On the other hand, increasing S in the classical graph coloring algorithms decreases the performance at high-capacity regions because it only assigns one subband to each femtocell independent from the interference condition.

Figure 13:
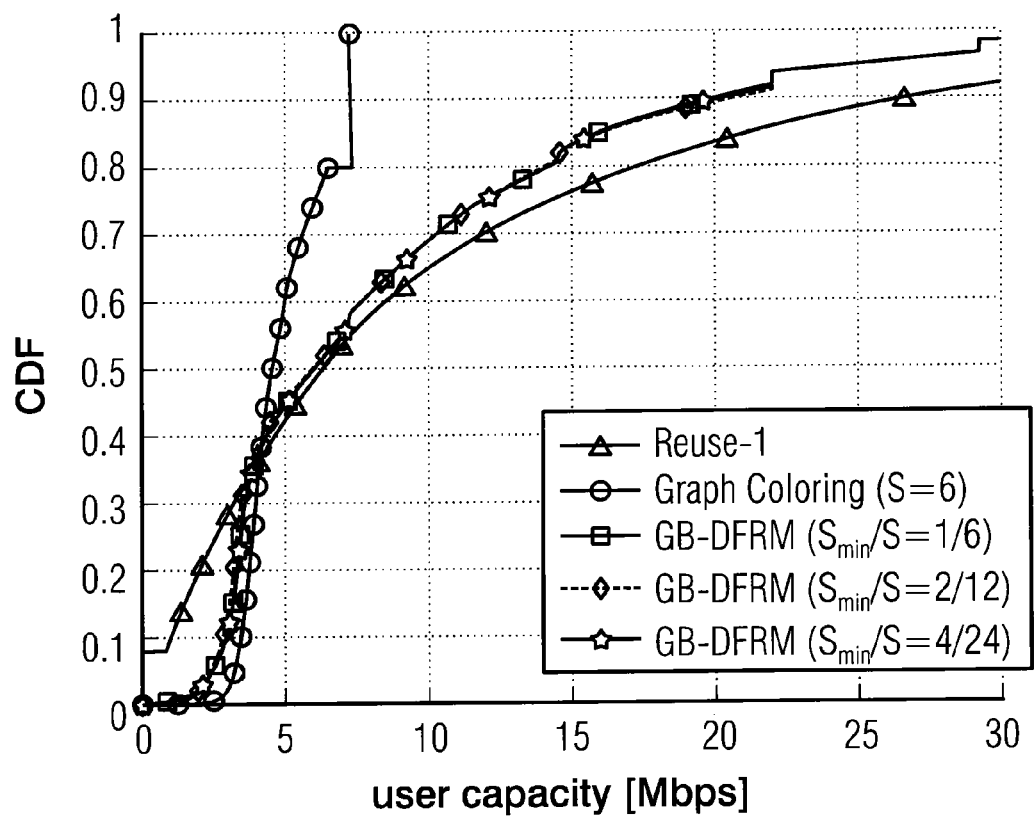
FIG. 13 is a graph comparing the capacity performance of GB-DFRM for different subband numbers.

FIG. 13 compares the capacity performance of GB-DFRM for different subband numbers S, namely S=6, 12 and 24. $s_{min}$ is set at 1, 2 and 4, respectively, to keep the $s_{min}$/S ratio constant. Thus, the bandwidth of the minimum assigned subband to each femtocell becomes the same for all three cases. In FIG. 13, it is clear that without changing the $s_{min}$/S ratio similar performances are obtained. Additionally, if the subband number is set larger then at least one interference-free subband is assigned to each femtocell which means an improvement in the low capacity regions.

Figure 14:
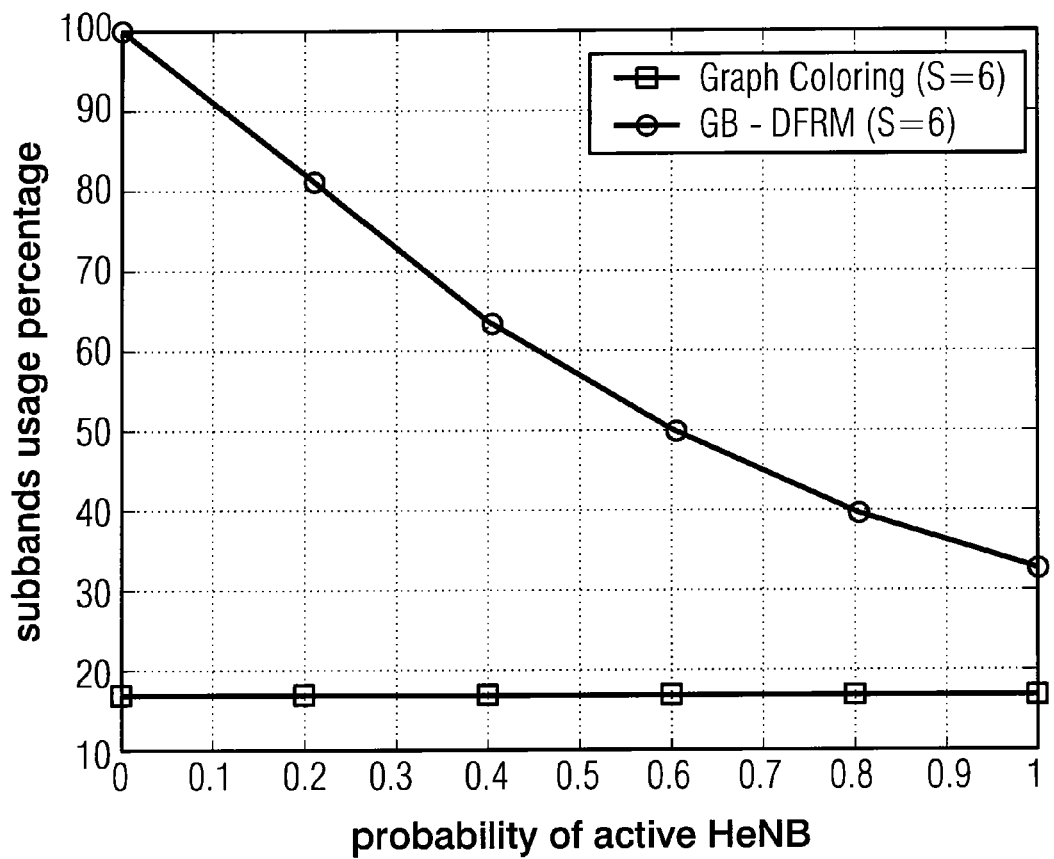
FIG. 14 is a graph comparing the subbands usage for different femtocell densities.

Finally, FIG. 14 compares the subbands usage for different femtocell densities where S=6 and $s_{min}$=1. It can be seen that as the femtocell density decreases (decrease in p), the subband usage increases. This figure shows how the inventive approach assigns the subbands to femtocells dynamically dependent from the environment and interference conditions. Also, under all femtocell densities, it uses more subbands than the conventional graph coloring algorithm whose subband usage is $100/6 \approx 16.7\%$. Moreover, by using nearly 30% of the subbands, the CDF plot shown in FIG. 13 is achieved. If power control techniques are used for the secondary subbands, further improvements can be achieved.

The goal of the inventive method is to assign priority subbands to femtocells depending on variable interference conditions. Instead of allocating the same number of subbands to femtocells, in accordance with the invention, resource assignment is done flexible in terms of the number of subbands. This increases the subband usage efficiency where femtocells can enjoy more bandwidth under less interference conditions. The simulation results show that with the inventive GB-DFRM an improvement in the lower capacities is traded off for a decrease of higher capacities. Also, depending on the network conditions, $s_{min}$ can be adapted. The minimum subband target may decrease the subband usage efficiency, however, it regulates the fairness in the resource assignment among femtocells. This prevents to assign an undesired amount of subbands to femtocells when a large number of subbands is used. It is also shown in the results described above that the inventive method does not depend on S if the $s_{min}/S$ ratio is kept constant. For the sake of simplicity, GB-DFRM was explained with regard to networks where HeNBs serve only one UE. However, the inventive approach can equally be applied to networks where HeNBs serve multiple UEs. In this case, similar to the one UE case, each HeNB takes the interference information from its UEs and depending on the UE feedback and $\gamma_{th}$, it defines the neighbors. Since the increase in the number of UEs can lead to an increase in interference neighbors, a limitation on the interfering neighbor number can be used in order to decrease the constraints in the interference graph.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed. Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier. Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer. A further embodiment of the inventive methods is, therefore, a data carrier (or a digital storage medium, or a computer-readable medium) comprising, recorded thereon, the computer program for performing one of the methods described herein. Yet a further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for assigning frequency subbands to a plurality of interfering nodes in a wireless communication network,
    wherein a number of subbands assigned to a node depends from the interference condition at the node, wherein as the node faces less interference it is assigned more subbands,
    wherein assigning subbands to interfering nodes comprises:
    (a) for each of the plurality of interfering nodes, selecting a frequency subband which causes a minimum decrease in subband usage in the network,
    (b) for each frequency subband, determining one or more of the interfering nodes, which face less or no interference with one or more of the remaining frequency subbands, and selecting one or more of the interference nodes which cause a minimum decrease in subband usage in a network, and
    (c) assigning the respective remaining one or more frequency subbands to the selected interfering nodes, and
    wherein subband usage is defined on the basis of the number of nodes interfering with a chosen node to which a specific subband is assigned.

2. A method for assigning frequency subbands to a plurality of interfering nodes in a wireless communication network,
    wherein a number of subbands assigned to a node depends from the interference condition at the node, wherein as the node faces less interference it is assigned more subbands,
    wherein assigning subbands to interfering nodes comprises:
    (a) for each of the plurality of interfering nodes, selecting a frequency subband which causes a minimum decrease in subband usage in the network,
    (b) for each frequency subband, determining one or more of the interfering nodes, which face less or no interference with one or more of the remaining frequency subbands, and selecting one or more of the interference nodes which cause a minimum decrease in subband usage in a network, and
    (c) assigning the respective remaining one or more frequency subbands to the selected interfering nodes, and
    wherein subband usage by assigning a specific subband to a chosen node is defined on the basis of the costs of the subband assignment to the network,
    wherein the costs are determined on the basis of a set of nodes, each node of which comprises the following properties: (a) the node is a neighbor of the chosen node, (b) the specific subband is not assigned to the node, and (c) the specific subband is not assigned to a neighbor of the node, and
    wherein the decrease in subband usage is minimum when the costs are minimum.

3. A method for assigning frequency subbands to a plurality of interfering nodes in a wireless communication network, wherein a number of subbands assigned to a node depends from the interference condition at the node, wherein as the node faces less interference it is assigned more subbands, wherein assigning subbands to interfering nodes comprises:

(a) for each of the plurality of interfering nodes, selecting a frequency subband which causes a minimum decrease in subband usage in the network, (b) for each frequency subband, determining one or more of the interfering nodes, which face less or no interference with one or more of the remaining frequency subbands, and selecting one or more of the interference nodes which cause a minimum decrease in subband usage in a network, and (c) assigning the respective remaining one or more frequency subbands to the selected interfering nodes, and wherein step (a) comprises for each interfering node:

(a1) selecting an interfering node comprising the largest number of neighboring nodes, (a2) for the selected node, finding out the available subbands that can be assigned to the selected node as a priority subband, (a3) in case one or more available subbands exist, selecting the subband causing the minimum decrease in subband usage, and (a4) in case no available subband exists, selecting no subband for the node.

4. The method of claim 3, wherein steps (a1) to (a4) are repeated a predefined number of times, the predefined number of times being defined by the minimum number of priority subbands that is tried to be assigned to each node.

5. A method for assigning frequency subbands to a plurality of interfering nodes in a wireless communication network, wherein a number of subbands assigned to a node depends from the interference condition at the node, wherein as the node faces less interference it is assigned more subbands, wherein assigning subbands to interfering nodes comprises:

(a) for each of the plurality of interfering nodes, selecting a frequency subband which causes a minimum decrease in subband usage in the network, (b) for each frequency subband, determining one or more of the interfering nodes, which face less or no interference with one or more of the remaining frequency subbands, and selecting one or more of the interference nodes which cause a minimum decrease in subband usage in a network, and (c) assigning the respective remaining one or more frequency subbands to the selected interfering nodes, and wherein steps (b) and (c) comprise for each subband:

determining all available nodes to which the subband can be assigned as a priority subband, assigning the subband to the node which causes a minimum decrease in subband usage, and in case more than one node provides minimum decrease in subband usage, assigning a subband to those nodes comprising a minimum number of subbands assigned thereto.

6. The method of claim 1, wherein the interfering nodes are femtocell access points formed by base stations deployed by a user, wherein interfering nodes are neighboring nodes, wherein a neighbor of a given node is defined as a node which caused an interference with a mobile unit serviced by the given node, wherein each node services one or more mobile units.

7. The method of claim 6, wherein the wireless communication network comprises a central controller which assigns frequency subbands to the interfering nodes, the central controller holding a neighbor list for each femtocell, the method comprising:

in case of a change in one or more neighbor lists, reporting the change to the central controller, wherein the central controller, in response to a change, dynamically re-assigns the frequency subbands to the interfering nodes.

8. The method of claim 1, wherein in case assigning the frequency subbands resulted in one or more interfering nodes not having assigned thereto a subband, the method further comprises:

assigning to any non-assigned interfering node a subband which is used by a minimum number of nodes neighboring the non-assigned interfering nodes.

9. A non-transitory computer program product comprising a program comprising instructions stored by a machine-readable carrier, the instructions, when run on a computer, executing a method for assigning frequency subbands to a plurality of interfering nodes in a wireless communication network, wherein a number of subbands assigned to a node depends from the interference condition at the node, wherein as the node faces less interference it is assigned more subbands, wherein assigning subbands to interfering nodes comprises:

(a) for each of the plurality of interfering nodes, selecting a frequency subband which causes a minimum decrease in subband usage in the network, (b) for each frequency subband, determining one or more of the interfering nodes, which face less or no interference with one or more of the remaining frequency subbands, and selecting one or more of the interference nodes which cause a minimum decrease in subband usage in a network, and (c) assigning the respective remaining one or more frequency subbands to the selected interfering nodes, and wherein the method comprises one or more of the following subband usage is defined on the basis of the number of nodes interfering with a chosen node to which a specific subband is assigned, or subband usage by assigning a specific subband to a chosen node is defined on the basis of the costs of the subband assignment to the network, the costs are determined on the basis of a set of nodes, each node of which comprises the following properties: (a) the node is a neighbor of the chosen node, (b) the specific subband is not assigned to the node, and (c) the specific subband is not assigned to a neighbor of the node, and the decrease in subband usage is minimum when the costs are minimum, or step (a) comprises for each interfering node (a1) selecting an interfering node comprising the largest number of neighboring nodes, (a2) for the selected node, finding out the available subbands that can be assigned to the selected node as a priority subband, (a3) in case one or more available subbands exist, selecting the subband causing the minimum decrease in subband usage, and (a4) in case no available subband exists, selecting no subband for the node, or steps (b) and (c) comprise for each subband determining all available nodes to which the subband can be assigned as a priority subband, assigning the subband to the node which causes a minimum decrease in subband usage, and in case more than one node provides minimum decrease in subband usage, assigning a subband to those nodes comprising a minimum number of subbands assigned thereto.

10. A controller for a wireless communication network, the wireless communication network comprising a plurality of nodes, the controller comprising:

a storage configured to receive and store a list of neighbors from the plurality of nodes, and a processor configured to assign frequency subbands to interfering nodes of the wireless communication network, interfering nodes being determined from the list of neighbors, wherein the processor is configured to assign a number of subbands to a node dependent from the interference condition of a node, wherein as the node faces less interference, it is assigned more subbands wherein for assigning subbands to the interfering nodes the processor is configured to:

(a) select for each of the plurality of interfering nodes a frequency subband, which causes a minimum decrease in subband usage in the network;

(b) determine for each frequency subband, one or more of the interfering nodes, which face less or no interference with one or more of the remaining frequency subbands, and select one or more of the interference nodes, which cause a minimum decrease in subband usage in the network, and (c) assign the respective remaining one or more frequency subbands to the selected interfering node, wherein the processor comprises one or more of the following subband usage is defined on the basis of the number of nodes interfering with a chosen node to which a specific subband is assigned, or subband usage by assigning a specific subband to a chosen node is defined on the basis of the costs of the subband assignment to the network, the costs are determined on the basis of a set of nodes, each node of which comprises the following properties: (a) the node is a neighbor of the chosen node, (b) the specific subband is not assigned to the node, and (c) the specific subband is not assigned to a neighbor of the node, and the decrease in subband usage is minimum when the costs are minimum, or step (a) comprises for each interfering node (a1) selecting an interfering node comprising the largest number of neighboring nodes, (a2) for the selected node, finding out the available subbands that can be assigned to the selected node as a priority subband, (a3) in case one or more available subbands exist, selecting the subband causing the minimum decrease in subband usage, and (a4) in case no available subband exists, selecting no subband for the node, or steps (b) and (c) comprise for each subband determining all available nodes to which the subband can be assigned as a priority subband, assigning the subband to the node which causes a minimum decrease in subband usage, and in case more than one node provides minimum decrease in subband usage, assigning a subband to those nodes comprising a minimum number of subbands assigned thereto.

11. A wireless communication system, comprising:

a plurality of nodes, wherein at least some of the nodes are interfering nodes, and a central controller of claim 10 for a wireless communication network, the wireless communication network comprising a plurality of nodes.

12. The wireless communication system of claim 11, wherein the central controller is configured to re-assign the frequency subbands when the interference conditions change.

* * * * *